(12) United States Patent  (10) Patent No.: US 8,977,781 B1
Yokoi et al.  (45) Date of Patent: Mar. 10, 2015

(54) COMPUTER SYSTEM

(71) Applicant: Hitachi, Ltd., Tokyo (JP)

(72) Inventors: Nobuhiro Yokoi, Tokyo (JP); Mutsumi Hosoya, Tokyo (JP); Kazushi Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/212,395

(22) Filed: Mar. 14, 2014

Related U.S. Application Data

(63) Continuation of application No. PCT/JP2013/080133, filed on Nov. 7, 2013.

(51) Int. Cl.
*G06F 13/14* (2006.01)
*G06F 13/28* (2006.01)

(52) U.S. Cl.
CPC ................................. *G06F 13/28* (2013.01)
USPC ................................................ 710/5; 710/74

(58) Field of Classification Search
None
See application file for complete search history.

(56) References Cited

U.S. PATENT DOCUMENTS

| | | | |
|---|---|---|---|
| 6,584,513 B1* | 6/2003 | Kallat et al. | 710/22 |
| 8,554,963 B1 | 10/2013 | Shapiro et al. | |
| 2003/0225724 A1* | 12/2003 | Weber | 707/1 |
| 2007/0201434 A1* | 8/2007 | Nakamura et al. | 370/352 |
| 2008/0263190 A1 | 10/2008 | Serizawa et al. | |
| 2012/0089788 A1* | 4/2012 | Hemmi et al. | 711/149 |
| 2012/0179804 A1 | 7/2012 | Katanp et al. | |
| 2012/0185634 A1 | 7/2012 | Shirai et al. | |

FOREIGN PATENT DOCUMENTS

| | | |
|---|---|---|
| JP | 2011-065551 A | 3/2011 |
| JP | 2012-150623 A | 8/2012 |
| WO | 2013/118243 A1 | 8/2013 |

OTHER PUBLICATIONS

The English language translation for the Written Opinion in the International Search Report received in International Application No. PCT/JP2013/080133.

* cited by examiner

*Primary Examiner* — Ilwoo Park
(74) *Attorney, Agent, or Firm* — Mattingly & Malur, PC

(57) ABSTRACT

A computer system includes a first storage control module and at least one server module. The first storage control module includes plural storage processors. Each server module includes a server processor and a server I/F connected to the server processor and at least two of the plurality of storage processors. The sever I/F of an issuance server which is any one of the at least one server module specifies the storage processor by referring to sorting information in which identification information of the issuance server of an I/O request issued by the server processor of the issuance server, identification information of a destination storage area of the I/O request, and identification information of the storage processor in charge of the destination storage area are correlated with each other, and sends a command based on the I/O request to the specified storage processor.

18 Claims, 14 Drawing Sheets

FIG. 3

| ISSUE SOURCE ID | | |
|---|---|---|
| CHASSIS NUMBER | BLADE NUMBER | SERVER PORT NUMBER |

VM PORT NUMBER

| ISSUE SOURCE ID | | | |
|---|---|---|---|
| CHASSIS NUMBER | CLUSTER NUMBER | PROCESSOR NUMBER | STORAGE PORT NUMBER |

| PORT NUMBER | MP NUMBER |
|---|---|
| 0 | A1 |
|  | A2 |
| 1 | B1 |
|  | B2 |

1402

| PORT NUMBER | | MP NUMBER | |
|---|---|---|---|
| NUMBER | BIT EXPRESSION | NUMBER | BIT EXPRESSION |
| 0 | 00 | 0 | 0000 |
|  |  | 1 | 0001 |
|  |  | 2 | 0010 |
|  |  | 3 | 0011 |
| 1 | 01 | 4 | 0100 |
|  |  | 5 | 0101 |
|  |  | 6 | 0110 |
|  |  | 7 | 0111 |

CORRESPONDENC

COMPUTER SYSTEM

CROSS-REFERENCE TO RELATED APPLICATION

This is a continuation of International Application PCT/JP2013/080133, with an international filing date of Nov. 7, 2013, which is incorporated herein by reference.

BACKGROUND OF THE INVENTION

1. Field of the Invention

The present invention relates to storage control, and more particularly, to an input/output (I/O) process of a server on a storage.

2. Background Art

In general, in a computer system including a server device and a storage device, the server device and the storage device made by different vendors are connected to each other via a communication network (for example, fibre channel (FC) network or an internet protocol (IP)). When plural microprocessors (MP) (processors that perform a data storing process) mounted on the storage device and memories used by the MPs have deviations at the time of an I/O process of the server device, I/O performance is not improved as intended. In addition, a technique of enabling a controller of a storage to dynamically change an MP for performing processes is known (for example, see US Unexamined Patent Application Publication No. 2008-263190).

In a configuration in which a storage device is connected to each of plural server devices, an accessible range of each server device is limited and thus information is distributed, thereby causing an increase in management cost and less convenience. The specific input data may not be accessed from management tasks such as maintenance of server devices or addition of storage capacity. Accordingly, in the I/O of the server devices on the storage devices with a network switch (for example, an FC switch or a router) inserted into a communication network, plural server devices can be connected to the same storage devices by routing of a network switch device. By causing plural server devices to share storage devices, all server devices can access the same data and a server device can access any data, for example, even when another server device malfunctions. The storage capacity can be unitarily managed, which is beneficial in terms of management cost and convenience.

SUMMARY OF THE INVENTION

With an improvement in performance of a server and a storage and an increase in bandwidth of a back end due to use of a storage in a flash memory storage device, it has become necessary to broaden a connection band between the server and the storage. With an improvement in performance of a server, it has also become necessary to improve a response time from a storage. An increase in the number of FC ports, use of next-generation products, or the like can be considered as a solution to the above-mentioned problems, which results in an increase in cost. For the purpose of an increase in bandwidth and a low latency at low cost, a simple and thick connection method such as bus connection can be suitably used. Therefore, by connecting a server and a storage directly to each other without depending on a forwarding function of a network switch to form a unified chassis, it is possible to solve problems in bandwidth and latency. In this configuration, the uniformization of loads between storage MPs is considered while reducing loads of the storage MPs. The maintenance of flexibility and extensibility of a system is intended with a configuration in which a server and a storage are connected directly to each other.

An object of the present invention is to suppress a decrease in flexibility or extensibility of a computer system while implementing a close connection between a server and a storage.

A computer system according to an aspect of the present invention includes a first storage control module and at least one server module. The first storage control module includes a plurality of storage processors. Each server module includes a server processor and a server interface device (server I/F) connected to the server processor and at least two of the plurality of storage processors. The sever processor of an issuance server which is any one of the at least one server module issues an I/O request. The server I/F of the issuance server receives the I/O request from the server processor of the issuance server, specifies the storage processor by referring to sorting information in which identification information of the issuance server issuing the received I/O request, identification information of a destination storage area of the I/O request, and identification information of the storage processor in charge of the destination storage area are correlated with each other, and sends a command based on the I/O request to the specified storage processor.

According to the aspect of the present invention, it is possible to suppress a decrease in flexibility or extensibility of a computer system while implementing a close connection between a server and a storage.

BRIEF DESCRIPTION OF THE DRAWINGS

FIG. 3 is a diagram illustrating configurations of an issuance source ID and an issuance destination ID.

FIG. 14 is a diagram illustrating a first example and a second example of correlation between port numbers of a BEIF unit and MP numbers.

DETAILED DESCRIPTION OF THE INVENTION

Hereinafter, several embodiments will be described.

In the below description, information may be described by an expression of "xxx table", but information may be expressed in any data structure. That is, in order to describe that information does not depend on a data structure, "xxx table" may be referred to as "xxx information".

In the below description, numbers are used as identification information of various objects (for example, chasses and ports), but other types of identification information may be used instead of or in addition to the numbers.

In the below description, a "VOL" is an abbreviation of a logical volume and is a logical storage device. The VOL may be a real VOL (RVOL) or a virtual VOL (VVOL). The VOL may include an on-line VOL provided to an external device (for example, a server device) connected to a storage device providing the VOL and an off-line VOL not provided to the external device (not recognized by the external device). The "RVOL" is a VOL based on physical storage resources (for example, an RAID (Redundant Array of Independent (or Inexpensive) Disks) group including plural PDEVs) in a storage device having the RVOL. The "VVOL" is based on, for example, storage resources (for example, VOLs) of an external storage device connected to a storage device including the VVOL, includes an external VOL (EVOL) which is a VOL based on a storage virtualization technique and plural virtual pages (virtual storage areas), and can be classified into a VOL (TPVOL) based on a capacity virtualization technique (typically, Thin Provisioning) and a snap-shot VOL provided as a snap-shot of an original VOL. The TPVOL is typically an on-line VOL. The snap-shot VOL may be an RVOL. The "PDEV" is an abbreviation of a nonvolatile physical storage device. Plural RAID groups may be constructed by plural PDEVs. The RAID group may be referred to as a parity group. A "pool" is a logical storage area (for example, a set of plural pool VOLs) and may be prepared for each application. For example, the pool may include a TP pool and a snap-shot pool. The TP pool is a storage area including plural real pages (real storage areas). Real pages may be allocated from the TP pool to the virtual pages of the TPVOL. The snap-shot pool may be a storage area in which data saved from an original VOL is stored. The "pool VOL" is a VOL which is an element of a pool. The pool VOL may be an RVOL or an EVOL. The pool VOL is typically an off-line VOL.

Embodiment 1

Figure 1:
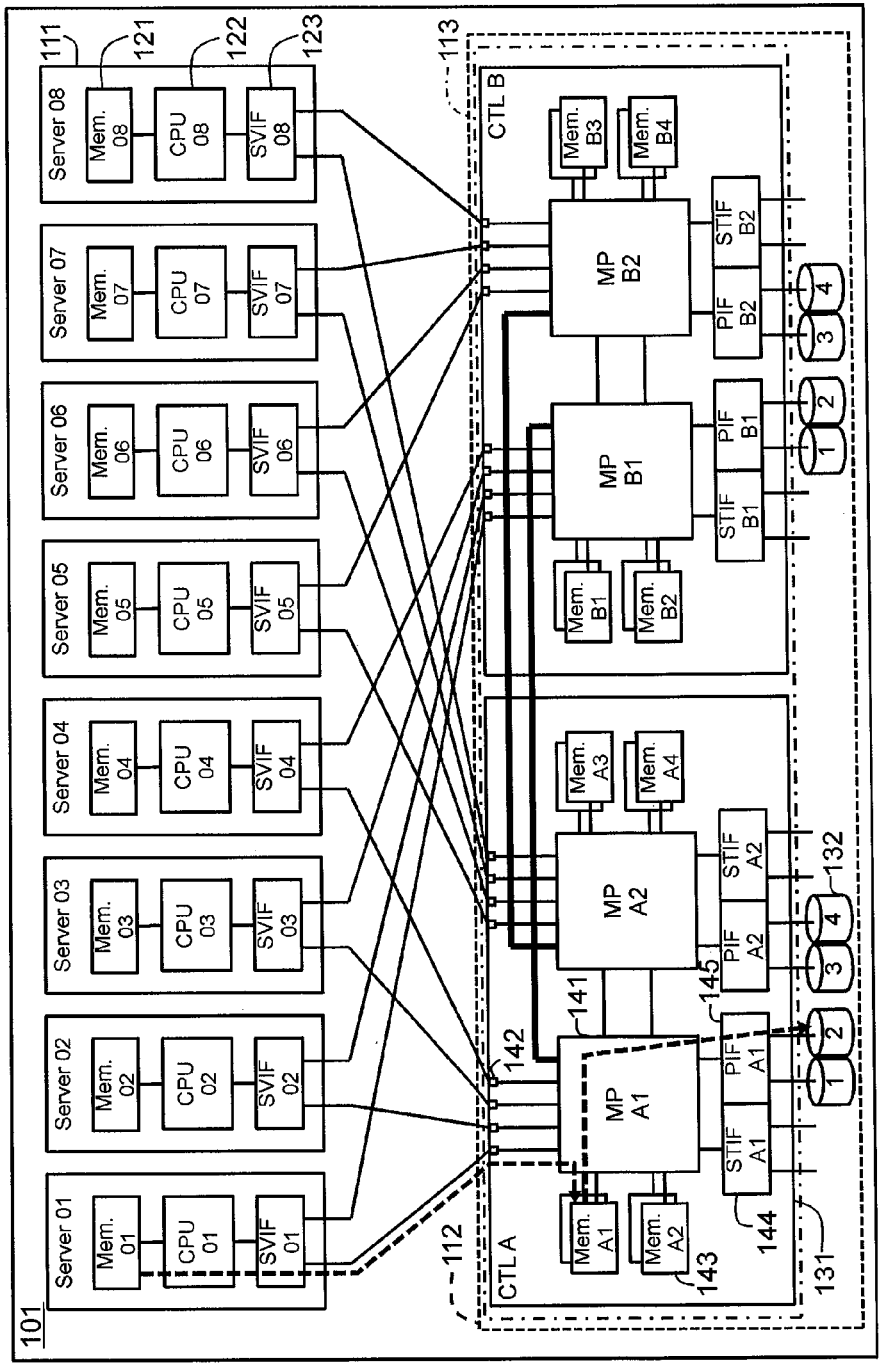
FIG. 1 is a diagram illustrating a configuration of a computer system according to Embodiment 1.

FIG. 1 is a diagram illustrating a computer system according to Embodiment 1.

First, the outline of Embodiment 1 will be described below.

A computer system includes a server module (hereinafter, referred to as a server) 111 and a storage control module 113 connected to the server 111 via a bus. In this embodiment, plural server modules are provided and all of them are connected to the storage control module. The storage control module 113 includes plural microprocessors (MP) 141. The plural servers 111 are connected to plural controllers 131 of the storage control module 113, respectively, and each server 111 may have a path to one controller 131 (for example, CTL A) and a redundant path to another controller 131 (for example, CTL B). Each server 111 includes a central processing unit (CPU) 122 issuing an input/output (I/O) request and a server I/F (hereinafter, referred to as an SVIF) 123 which is a communication interface circuit. The SVIF 123 specifies a target MP 141 out of plural MPs 141 using an MP search table (management table for searching the MPs) on the basis of the issued I/O request and issues an I/O command for the target MP 141 to the target MP 141. That is, the SVIF 123 designates the MP 141 to process the I/O command in response to each I/O request. The I/O command is processed by the designated target MP 141. Accordingly, the SVIF 123 can connect the plural servers 111 to the storage control module 113 without using a network switch by designating a path to be used out of plural paths including a redundant path and a target MP 141 located at the destination of the path so as to process an I/O command and sending the I/O command thereto, thereby suppressing a decrease in flexibility or extensibility of the computer system. Transmission of I/O target data based on an I/O command is carried out by direct memory access (DMA). The body of an I/O command may be transmitted by DMA. Data or commands are directly transmitted from a server memory 121 to a storage memory 143.

Embodiment 1 will be described below in detail.

The computer system includes a chassis 101. The chassis 101 includes N servers 111 and a storage module (hereinafter, referred to as a storage) 112 connected to the N servers 111. That is, the computer system is a unified system in which the servers 111 and the storage 112 are combined and received in the same chassis 101, and provides easy introduction and unitary operation management due to the configuration. In Embodiment 1, N=8 is set, but N may be an integer greater than or equal to 2 and N servers 111 share the storage 112. The storage 112 includes the storage control module 113 and plural PDEVs 132 connected to the storage control module 113. The storage control module 113 includes a controller (hereinafter, referred to as a CTL) 131 controlling an input/output (I/O) on the PDEVS 132.

Each server 111 is, for example, a printed circuit board (for example, a so-called blade server). Each server 111 includes a server memory 121, an SVIF 123, and a CPU 122 connected thereto. The server memory 121 stores a computer program and data. The CPU 122 executes the computer program stored in the server memory 121. Examples of the computer program include a server virtualization program (for example, hypervisor) and an application program. The CPU 122 can implement one or more virtual machines (hereinafter, referred to as VM) by executing the server virtualization program. The CPU 122 can also execute the application program. The CPU 122 can issue an I/O request including I/O destination information by executing such computer programs. The I/O destination information is information indicating an area in the VOL and may be, for example, information including a logical unit number (LUN) and a logical block address (LBA). The SVIF 123 is a communication interface circuit and is, for example, an application specific integrated circuit (ASIC). The SVIF 123 can transmit an I/O command including the I/O destination information indicated by the I/O request in response to the issued I/O request.

The CTL 131 is, for example, a printed circuit board. The CTL 131 includes a storage port 142, a storage memory 143, a PDEV I/F (hereinafter, referred to as PIF) 145, a storage I/F (hereinafter, referred to as STIF) 144, a microprocessor (MPs) 141 connected thereto. One or more PDEVs 132 are connected to the PIF 145. The storage memory 143 stores a computer program and data. An example of the data is an MP search table. The MP search table is prepared by the MP 141 as will be described later. The MP 141 can perform an I/O process on the PDEV 132 via the PIF 145 in accordance with an I/O command by executing the computer program stored in the storage memory 143. The PIF 145 and the PDEV 132 can communicate with each other via a predetermined protocol such as a fibre channel (FC) or a serial attached SCSI (SAS). The storage memory 143 may be provided to each MP 141. At least one of the PIF 145 and the STIF 144 may be provided to each MP 141. The STIF 144 is a communication interface circuit and is, for example, an ASIC. The STIF 144 can be connected to an STIF of another storage control module (not illustrated). Accordingly, the storage control module 113 can be scaled out (an example of a computer system having a scaled-out storage control module will be described in Embodiment 2). In Embodiments 1 and 3, the STIF 144 may be skipped. Only the PIF may be employed instead of the STIF. The STIF and the SVIF may be embodied by the same hardware.

The CTL 131 includes one or more MPs 141. The MPs 141 may take charge of different VOLs (VOLs which can be set as an I/O destination). The CTL 131 is dualized and thus the MP 141 is dualized. The dualized MPs 141 (the dualized CTLs 131) may communicate with each other. When one MP 141 malfunctions, failover may be executed between the malfunctioned MP and the other dualized CTL.

Eight servers 111 are connected to the storage control module 113 via a bus. Since this bus is an internal bus used to connect elements of the servers 111 or the storage control module 113, a broader band can be generally achieved in comparison with external connection. For example, a PCI-express (PCIe) protocol is used as the bus. By using the internal bus, it is not necessary to prepare an FC frame or the like and it is thus possible to reduce a processing load. By enabling data to be directly transmitted from the server memory 121 to the storage memory 143, it is possible to reduce loads of the MPs and to realize a low latency. By directly connecting the servers 111 to the storage 112 via the PCIe, a network switch such as an FC switch which was necessary in the related art is unnecessary and a cable length can be reduced by incorporating the elements in a single chassis, thereby achieving a merit of a decrease in cost.

Each SVIF 123 includes F back-end interface unit (hereinafter, referred to as a BEIF unit) (not illustrated in FIG. 1). Accordingly, N servers 111 include (N×F) BEIF units. Each CTL 131 includes G storage ports 142. Since the CTL 131 is H-times dualized (H=2 in Embodiment 1), the storage control module 113 includes (G×H) storage ports 142. (N×F) and (G×H) may not have the same value, but (N×F) and (G×H) in Embodiment 1 have the same value and N=8, F=2, G=N=8, and H=F=2 are set. Two BEIF units of each SVIF 123 are connected to the storage ports 142 of two CTLs 131, respectively. H is not an integer greater than or equal to 2, but may be 1. The SVIF 123 may not be located in the server 111, but may be located between the server 111 and the controller 131 so as to perform the functions described in this embodiment. When the SVIF 123 is disposed in the server 111, the redundancy between the server 111 and the storage 112 can be ensured, thereby enhancing reliability. A single server 111 may be provided with plural SVIFs 123.

Each CTL 131 includes p MPs 141 (where p is an integer greater than or equal to 1) and thus the storage control module 113 includes (p×H) MPs 141. Since the storage control module 113 includes plural MPs 141, the I/O processes of plural servers 111 can be distributed and processed, thereby expecting improvement of a response time. The (p×H) MPs 141 are connected to (G×H) storage ports 142. One MP 141 is connected to G/p storage ports 142 of G storage ports 142 of the CTL 131 including the MP 141. In Embodiment 1, since p=2 and G=8 are set, one MP 141 is connected to four storage ports 142.

In FIG. 1, serial numbers are allocated to the same types of elements so as to distinguish the same types of elements. For example, serial numbers such as 01, 02, ... are allocated to the servers 111, and serial numbers such as A and B are allocated to the CTL 131. In FIG. 1, in order to easily understand the relationship between parent elements and child elements (elements of parent elements), the same serial numbers as the serial numbers allocated to the parent elements are allocated to the child elements. For example, the same serial number "01" is allocated to the server memory 121, the CPU 122, and the SVIF 123 of the server 111 having the serial number "01" allocated thereto, and serial numbers including the same serial number "A" are allocated to the MP 141, the storage memory 143, the PIF 145, and the STIF 144 of the CTL 131 having the serial number allocated thereto. Hereinafter, reference signs will be used for description when the same type of elements are not distinguished, and serial numbers will be used for description when the same type of elements are distinguished.

Embodiment 1 will be described in more detail with several elements as an example. Description of the elements is true of the same type of different elements.

The MP A1 includes storage memories A1 and A2, a PIF A1, and an STIF A1. Each of the MP A1 and the MP A2 may be dualized with an MP B1 and an MP B2 as illustrated. The dualized PIFs A1 and B1 are connected to the same PDEV (for example, PDEVs 1 and 2). The dualized MPs A1 and B1 are connected to communicate with each other.

The MP A1 (or A2) and the MP B1 (or B2) constitute an MP cluster. When one MP A1 (or A2) malfunctions, failover may be executed using the other MP B1 (or B2). Each of MPs A1 and A2 may be correlated with one or more VOL in charge. For example, the VOLs taken charge of by the MP A1 out of VOLs 1 to 4 (not illustrated) may be VOL 1 and VOL 2, and the VOLs taken charge of by the MP A2 may be VOL 3 and VOL 4. In other words, the MP in charge of VOL 1 and VOL 2 may be the MP A1, and the MP in charge of VOL 3 and VOL 4 may be the MP A2. The storage ports 142 may be correlated with the VOLs which can be provided from the storage ports 142. The VOL correlated with a storage port 142 may be a VOL taken charge of by the MP 141 connected to the storage port.

The MP A1 creates the MP search table so as to enable each SVIF 123 to refer to a part of all thereof. A part or all of the MP search table may be stored or copied with any of the SFIV 123, the server, and the storage or an arbitrary combination thereof and the resultant may be referred to.

The dotted line in FIG. 1 represents a flow of writing target data (hereinafter, referred to as WR data). The CPU 01 stores a writing request having a VOL (for example, an RVOL based on the PDEV 2 or TPVOL to which an area based on the PDEV 2 is allocated) based on the PDEV 2 as a writing destination and the WR data in the server memory 01. The writing request includes an issuance source ID (see FIG. 3), a storage port number, and a writing destination LUN. The SVIF 01 acquires the writing request from the server memory 01 and specifies a target MP A1 from the MP search table on the basis of the issuance source ID and the writing destination LUN in the writing request. The SVIF 01 transmits a writing command including an issuance destination ID (see FIG. 3) including the number of the target MP A1 from the BEIF corresponding to the target MP A1 or stores the writing command in a writing command processing wait memory area (for example, queuing memory) for the target MP A1 specified by the issuance destination ID via the BEIF unit corresponding to the target MP A1. In the latter, the writing command may not include the number of the target MP A1, and the writing command is stored in the writing command processing wait memory area correlated with the number of the target MP A1. The writing command processing wait memory area is disposed in the storage memory A1 (or A2) of the target MP A1. For example, a command area 902 is disposed in the storage memory A1 illustrated in FIG. 9 and areas for the MP A1 and the MP A2 are disposed therein. When the updating of the MP search table is not made in time and the target MP of the I/O command is determined on the basis of the MP search table before the updating, the I/O command may be stored in an erroneous memory area (a memory area corresponding to the target MP determined on the basis of the MP search table after the updating). For example, the CTL including the MP for executing a process and the CTL including the memory area storing the I/O command having the MP as a target may be different from each other. In consideration of such a case, the areas for the MP B1 and the MP B2 may be provided to the command area 902 (for example, transmission areas 912 and 914) of the storage memory A1 so as to store the command for the MP B1 or B2 in the storage memory A1. In this case, the representative MP (for example, the MP A1) of the CTL A may transmit the command to the memory areas for the MP B1 or B2 in the memory of the CTL B. The data stored in the command processing wait memory area is sequentially read from the storage side. When the priority is defined and stored in (at least one of the memory area and) the I/O command, the I/O command is read in consideration thereof. The target MP A1 acquires the writing command and transmits a transmission request to the SVIF 01. The SVIF 01 transmits the WR data from the server memory 01 to the storage memory A1 (or A2) by DMA in response to the transmission request. Similarly to the I/O command, for example, the transmission request may be stored in a processing wait memory area (for example, a memory area formed in the storage memory A1 to correspond to the SVIF 01) corresponding to the SVIF 01, and the SVIF 01 may read the transmission request from the memory area. When the updating of the MP search table is not made in time and the CTL including the processing MP and the CTL including the memory area storing the I/O command are different from each other or when the SVIF 01 issues the I/O command to the CTL A and a cache is hit with the memory of the CTL B at that time, the storage control module 113 may issue the transmission request from the storage port of a CTL (for example, CTL B) other than the CTL (for example, CTL A) having the storage port receiving the I/O command to the SVIF 01. The memory area of a transmission request and the memory area of an I/O command response may be the same memory area, the memory area of a transmission response and the memory area of an I/O command request may be similarly the same memory area (queuing memory), and the MP may determine whether an extracted object is a request or a response when extracting the object from the memory area. Accordingly, a configuration in which the number of queuing memories (the number of memory areas) is reduced with respect to the memory capacity and the queuing number of one queuing memory (the number of objects which can be stored in one queuing memory) is increased may be employed. The target MP A1 writes the WR data in the storage memory A1 in the PDEV 2 serving as a basis of, the writing destination VOL (VOL correlated with the writing destination LUN) before or after returning a response to the writing command to the server 01.

When a reading request having the same VOL as the writing destination VOL as a reading source is issued by the CPU 01, a read command is transmitted from the SVIF 01 to the target MP A1 in response to the reading request and reading target data (hereinafter, referred to as RD data) corresponding to the reading command is read from the PDEV 2 to the storage memory A1 (or A2) by the target MP A1. The SVIF 01 transmits the RD data from the storage memory A1 (or A2) to the server memory 01 by DMA. In this way, since the WR data and the RD data are directly transmitted from memory to memory between the server 111 and the storage control module 113 by DMA, it is possible to reduce a frame creating load such as the FC and to reduce the I/O latency. Since the target MP is designated to perform the transmission, it is possible to reduce the I/O latency by load distribution of the MP and to efficiently use the bands. Since the I/O request is issued to the CTL other than the CTL including the target MP, a process of transmitting the I/O request to the CTL including the target MP is skipped. Since the overhead of temporarily receiving the I/O request by the use of a buffer memory and rearranging the I/O request in the memory area for the target MP can be reduced by storing the I/O request in the memory area for the target MP, it is possible to expect an increase in I/O speed. In this system configuration in which the server 111 and the storage 112 are directly coupled (coupled without using a network switch) to each other, all the servers 111 are connected to all the MPs 141, and there are plural paths between the servers 111 and the MPs 141. Examples of the method of issuing an I/O command to the MP B1 of the CTL B include a method of issuing an I/O command from the server 111 to the MP A1 of the CTL A, causing the MP A1 to pass (transmit) the I/O command to the MP B1 using the path between the CTL A and the CTL B, and causing the MP B1 to process the I/O command and a method of issuing an I/O command from the server 111 to the MP B1 of the CTL B and causing the MP B1 to process the I/O command. When it is scaled out, the number of transmission methods increases. The path through which the command passes is changed depending on what port to use to issue a command from plural ports (BEIF units), and the latency until reaching the target MP and the bandwidth of the path to be used increase. When the MP horizontally sends the command, the MP load increases, which causes a decrease in I/O speed. Since the configuration is fixed, a command is sent out to an appropriate MP from the first time so as to reduce the latency. Accordingly, in this system, the relationship between the storage area (VOL) of the storage of which data should be accessed and the MP is understood before sending a command and the command is transmitted via an appropriate BEIF unit after specifying the MP as a target.

Figure 2:
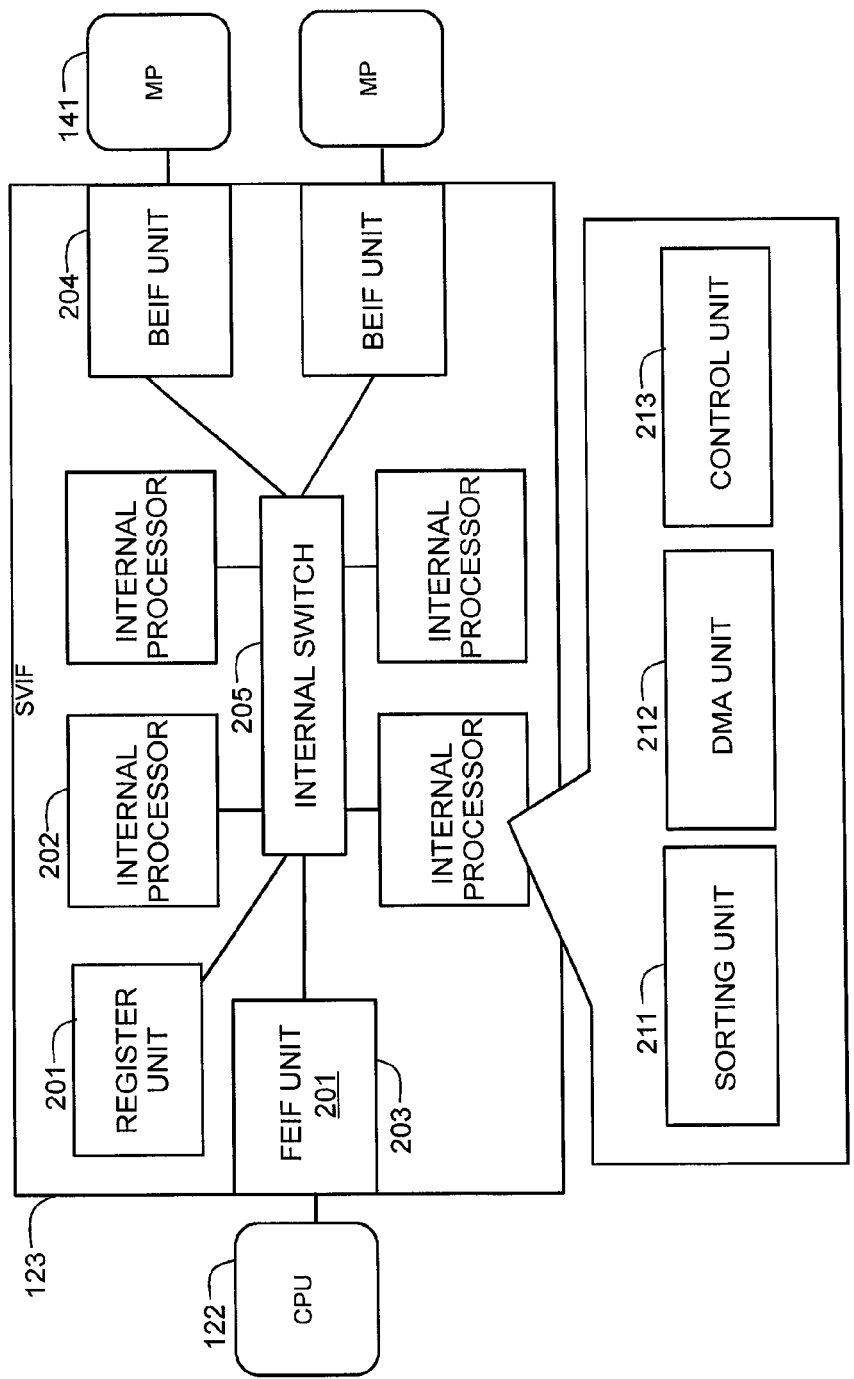
FIG. 2 is a diagram illustrating a configuration of an SVIF.

FIG. 2 is a diagram illustrating the configuration of the SVIF 123.

The SVIF 123 is an ASIC as described above and includes a front end interface unit (hereinafter, referred to as an FEIF unit) 203, an internal processor 202, a register unit 201, a BEIF unit 204, and an internal switch 205 connected thereto. Two or more internal processors 202 and two or more BEIF units 204 are provided as the elements of the SVIF 123, but the number of at least one type elements thereof may be one. The number of at least one type of elements other than the internal processor 202 and the BEIF unit 204 may be two or more.

The FEIF unit 203 is a communication interface unit (for example, port) connected to a front end device, and the BEIF unit 204 is a communication interface unit (for example, port) connected to a back end device. Specifically, the FEIF unit 203 is connected to the CPU 122 of the server 111 including the SVIF unit 123, and the BEIF unit 204 is connected to the MP 141 (the storage port 142). The register unit 201 stores a part or all of the MP search table. The register unit 201 may store data transmitted by DMA. The internal switch 205 switches connection between the elements of the SVIF unit 123.

The internal processor 202 serves as a sorting unit 211, a DMA unit 212, and a control unit 213 by executing a computer program such as firmware. The sorting unit 211 performs a sorting process. The sorting process includes specifying a target MP 141 on the basis of an I/O request issued by the CPU 122 and determining from which of two BEIF units 204 to transmit an I/O command to the specified MP 141. The DMA unit 212 transmits I/O target data corresponding to the I/O command. The control unit 213 controls the entire SFIV 123 by performing a malfunction-relevant process, an initialization process, or the like. In addition, dedicated hardware for supporting the processes of the internal processor may be provided. Although not illustrated in the drawing, a DMA unit for transmitting an I/O command or other control data may be separately provided. A DMA unit which is commonly used by the internal processors may be separately provided. A DMA unit may be provided to the FEIF unit or the BEIF unit, dedicated hardware serving as a queuing interface may be provided, or hardware for changing a protocol may be provided.

The configuration of the SVIF 123 is described above, but the configuration of the SVIF 123 may be equal to the configuration of the STIF 144. That is, a communication interface circuit (ASIC) having the same configuration may be mounted on the respective server 111 and the storage control module 113. Two or more SVIFs 123 and two or more STIFs 144 may be mounted on the respective servers 111 and the storage control module 113. The SVIF 123 may be separated so that a part thereof is disposed in the server and the other part is disposed in the storage. In this case, the principal functions such as the sorting unit are provided to the server and the number of storage ports of the SVIF 123 is set to two or more, which are connected to the plural CTLs.

FIG. 3 is a diagram illustrating the configurations of an issuance source ID and an issuance destination ID.

The issuance source ID is an ID included in an I/O request issued by the CPU 122 and may be, for example, referred to as a server identifier (S_ID). Hereinafter, a CPU issuing an I/O request may be referred to as an "issuance CPU", a server including the issuance CPU may be referred to as an "issuance server", a server memory included in the issuance server may be referred to as an "issuance server memory", and an SVIF included in the issuance server may be referred to as an "issuance SVIF". The issuance source ID includes, for example, a chassis number, a blade number, and a server port number. The chassis number is the number of the chassis including the issuance server. The blade number is the number of the issuance server. The server port number is the number of a port of the VM which is executed by the issuance CPU so as to issue an I/O request. In an environment in which the VM is not used, the sever port number may be the number of the BEIF unit 204 of the SVIF 123. When plural BEIF units 204 are present, the server port numbers are correlated with the plural BEIF units and the internal processor 202 causes the server 111 (CPU 122) to recognize the plural BEIF units 204 as plural ports or causes the server 111 (CPU 122) to recognize one BEIF unit 204 as one port and to use the other BEIF units 204 as a redundant port (redundant path) for redundancy of the SVIF unit 123. When the internal processor 202 causes the server 111 to recognize plural ports, the server 111 (CPU 122) may use any port as a redundant port or may cause the SVIF 123 to use any port as a redundant port.

In this embodiment, an area for the MP A1 and an area for the MP A2 are disposed in the storage memory 143 of the CTL A. These areas are used as areas for storing processing wait commands of the MP A1 and the MP A2, respectively.

The issuance destination ID includes numbers for specifying a path of an I/O command such as a chassis number, a cluster number, a processor number, and a storage port number. The chassis number is the number of a chassis including the MP for processing an I/O command. The cluster number is the number of a cluster including the MP for processing an I/O command in the chassis. The processor number is the number of an MP corresponding to a storage port in the cluster and may not necessarily equal to the MP number for processing the I/O command. The storage port number is the number of a storage port correlated with the processor number. Accordingly, since the numbers (which may be another type of identification information) are uniquely determined from the arrangement conditions in advance depending on the configuration due to the integrated configuration, a unique issuance destination ID can be set without adjustment using a switch or the like. The issuance destination ID may be the port number or the port number may be uniquely determined depending on the configuration as described above. For example, when the server 01 issues an I/O request to the MP A2, an I/O command having an issuance destination ID including the number of MP A1 which is the processor number of the MP in the path as a processor number is stored in a command processing wait memory area (for example, queuing memory) for the target MP A2 in the storage memory A1 (or A2) corresponding to the MP A1 in the path. Accordingly, the MP A2 can be caused to process the I/O command via the port correlated with the MP A1. Therefore, the final destination can be seen by the queue of the target for processing the I/O command without necessarily matching the processor number of the issuance destination ID with the processor number of the MP for processing the I/O command. In this case, the number of queues serving as an I/F between the SVIF 123 and the storage 112 is equal to the number of MPs to be sorted. The processor number of the issuance destination ID may be directly set to the processor number of the MP for processing the I/O command. In this case, plural I/O commands having different target MPs may be mixed into one queue, that is, the number of queues may be less than the number of MPs. The SVIF 123 can determine the issuance destination ID on the basis of information acquired through an initialization process to be described later.

Figure 4:
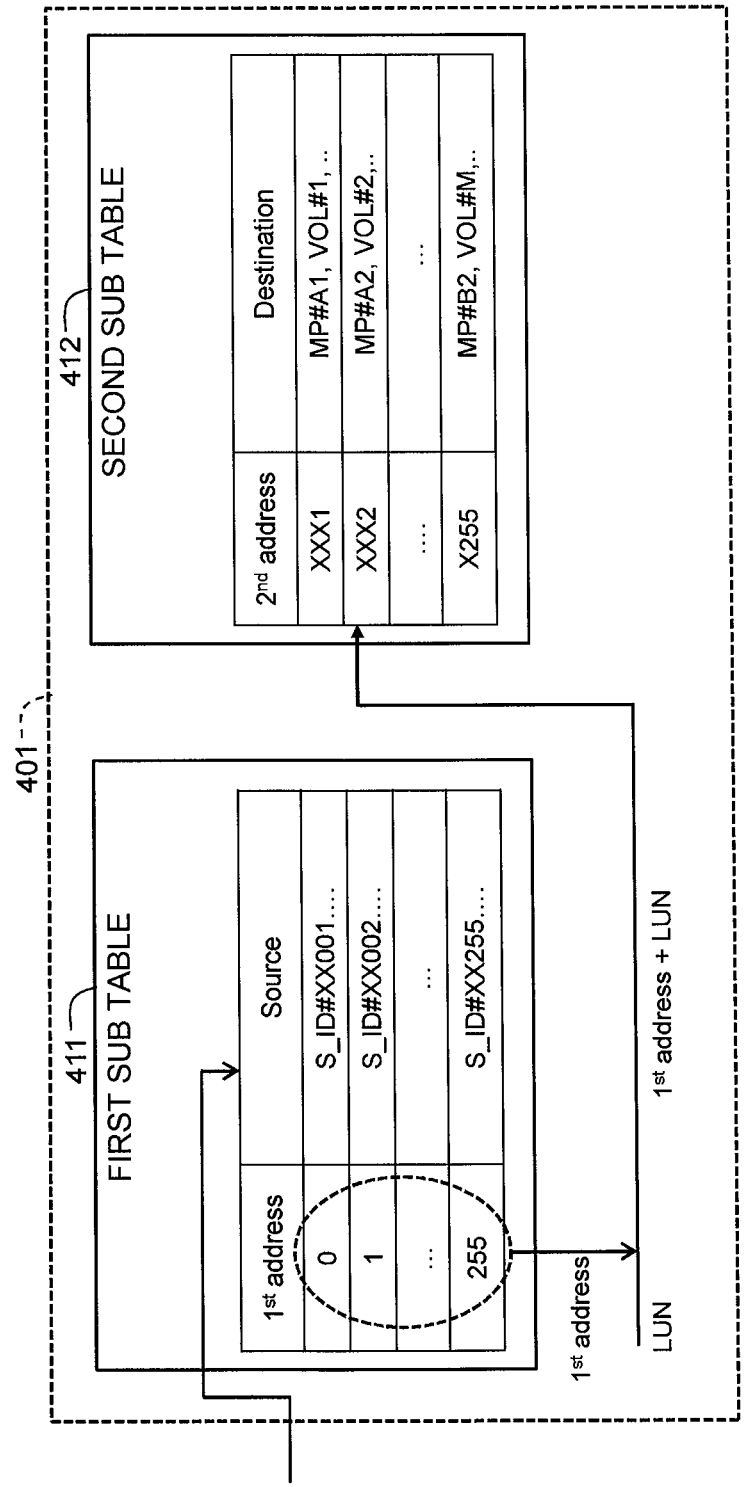
FIG. 4 is a diagram illustrating a configuration of an MP search table.

FIG. 4 is a diagram illustrating a configuration of an MP search table.

The MP search table 401 may include one table or plural tables. In this embodiment, the MP search table 401 includes plural tables, for example, a first sub table 411 and a second sub table 412.

The first sub table 411 includes plural records, and each record stores source information (identification number of a server 111 and a VM (virtual server) in the server 111) and an address (first address) for recording the source information. The second sub table 412 includes plural records, and each record stores an address. (second address) and destination information (information of the storage 112).

A first address for recording the source information (for example, identification information of a VM) and a second address in the second sub table 412 are created, for example, from the LUN and information on the storage 112 is stored as destination information in the record corresponding to the second address. The information on the storage 112 includes VOL information (for example, VOL number and capacity), port information (for example, storage port number) on the corresponding storage port 142, and information (for example, MP number (processor number of an MP)) on the MP 141 connected to the corresponding storage port 142. The MP search table 401 may include one table. The MP search table 401 may further include different tables in correlation with each other. For example, the MP number in the second sub table 412 may be virtualized, a table (third sub table) showing a correlation between a virtual MP number (virtualized MP number) and a real MP number is separately created, and only the third sub table is updated (for example, another real MP number is correlated with a virtual MP number corresponding to a real MP number of a malfunctioned real MP) and the second sub table 412 is not updated when a real MP malfunctions, whereby a table search load may be reduced. A logic memory such as a search memory may be used for the MP search table 401 or a combination with a normal memory may be used.

When a server 111 is subjected to a log-in process, an MP 141 creates the first sub table 411 on the basis of an identifier (identification information) for identifying the server 111 and sets the created first sub table 411 in the SVIF 123. A part of the storage memory 143 can be used as a common memory and this common memory can be accessed by all the MPs 141. The MPs 141 of the storage 112 store control information on all the VOLs in the common memory of the storage 112 in advance. The control information includes information of each VOL provided by the storage 112 and information (for example, MP number) for specifying an MP having an ownership of the corresponding VOL. In order to ensure redundancy, plural MPs 141 can access a single VOL, and the ownership thereof means what MP 141 mainly takes in charge of the process on the VOL. In order to distribute a load into plural MPs 141, it is preferable that the provided plural VOLs are correlated with plural different MPs 141 as main MPs in charge. Accordingly, the processes which should be performed on the I/O request from the server 111 are distributed into the MPs. Particularly, in the configuration according to this embodiment in which plural servers 111 share a single storage 112, since load uniformization between the MPs 141 is achieved, it is possible to prevent performance degradation of a system as a whole. The MP 141 creates the second sub table 412 including a first address indicated by the server identifier of the first sub table 411 and a second address having the LUN as an address on the basis of the control information in the common memory and disposes the second sub table 412 at a predetermined position in the storage memory 143. In the second sub table 412, VOL information correlated with the server identifier and the LUN and the MP number of the MP for processing an I/O process on the VOL indicated by the VOL information are stored as destination information (information on the storage) correlated with the second address. For each VOL, the identification information recognized by the storage side and the identification information (LUN) recognized by the server side are not necessarily matched with each other. For example, two different VOLs may be managed with the same LUN by two servers. Therefore, in this embodiment, it is assumed that one VOL is specified on the basis of the identification information of a server and the identification information (more specifically, the LUN which as the identification information of a volume) of a destination storage area indicated by an I/O request from the server and the owner MP of the specified VOL is specified.

The MP search table 401 can be updated by the MP 141 which can understand a storage condition. The SVIF 123 may receive information on the storage 112 from the storage 112 and the control unit 213 may create or update the MP search table 401 on the basis of the received information. The first sub table 411 may be stored in the register unit 201 of the SVIF 123 for the purpose of reducing the latency for reference and may be different depending on the servers 111. The second sub table 412 may be stored in at least one storage memory 143 and may be common to the servers 01 to 08. This is because the size of the second sub table 412 is large. As long as the SVIF 123 can refer to the table, both or one of the first and second sub tables 412 and 413 may be stored in the register unit 201, may be stored in the storage memory 143, or may be stored in the server memory 121. Both or one of the same first sub table 411 and the same second sub table 412 is disposed in plural locations and both may be synchronized with each other. In this embodiment, after the storage 112 refers to an access condition from a server 111 or a load condition, the MP 141 can create the MP search table 401. Therefore, in the system configuration in which plural serves 111 share a single storage 112, the processing load of an I/O command can be distributed into plural MPs 141.

For example, a timing at which an initialization process is performed before starting transmission of data or a timing at which the configuration of the storage side is changed can be considered as a timing of updating the MP search table 401. Specifically, at the time of data migration in which the position of data is changed and the I/O distribution can be changed, when the ownership of any volume is changed (for example, when an MP sorting table to be described later is changed), when a load of a certain MP is greater than a predetermined value, or when a certain MP malfunctions, the MP search table may be updated. The updating of the MP sorting table (a table showing the correlation between the VOLs and the MPs having the corresponding VOLs) may be performed by the MP 141 at any timing including a timing at which the load of a certain MP is greater than a predetermined value and a timing at which the volume configuration is changed. By this configuration, appropriate sorting matched with the conditions of the storage can be performed. When an I/O command is issued before the MP search table 401 is updated, the MP 141 to which the I/O command is sent processes the I/O command by itself or passes the processing of the I/O command to an MP in charge on the basis of the issuance ID (or the number of the MP correlated with the command processing wait memory area (for example, queuing memory) in which the I/O command is stored) of the I/O command. When a request does not have the LUN, the processing MP 141 may be determined depending on details of the request or the processing MP may be determined in advance for such a case.

The sorting unit 211 (SVIF 123) uses the issuance source ID of the I/O request as a key to specify a first address corresponding to the key from the first sub table 411. The server 111 may be virtualized and a single server 111 may have server identifiers of plural issuance sources. The sorting unit 211 (SVIF 123) uses a combination of the first address and the LUN of the I/O request as a key to specify destination information corresponding to the key from the second sub table 412. The specified destination information includes an MP number. Accordingly, a target MP 141 corresponding to the issuance source ID and the issuance destination LUN is specified, and the sorting unit 211 can create an issuance destination ID including the specified MP number or can acquire a command processing wait memory area (for example, queuing memory) corresponding to the specified MP number. By acquiring the MP number, the sorting unit 211 determines from what BEIF unit 204 to issue an I/O command. For example, when two BEIF units 204 (two ports) are provided and four MPs (MPs A1, A2, B1, and B2) are provided, the sorting unit 211 can determine the BEIF unit 204 through which the I/O command passes by storing correspondence between the MP A1 (or A2) and a first port (one BEIF unit 204) and correspondence between the MP B1 (or B2) and a second port (the other BEIF unit 204) in the SVIF 123 in advance (for example, by storing information such as a correspondence table 1401 illustrated in FIG. 14 in the register unit 201 of the SVIF 123 in advance). Since the relationship between the port number and the MP is determined in advance due to the integrated configuration, what MP corresponds to what port may be expressed by causing the bit of the port number to correspond to any bit position of the MP (for example, by setting the correspondence represented by reference numeral 1402 in FIG. 14 in the storing unit 211)

and a configuration in which the correspondence table is not provided may be employed. Since this system has a configuration in which the server 111 and the storage 112 are connected in advance, the configurations of the BEIF units 204 and the MPs 141 connected thereto are determined and thus the correspondence between the BEIF units 204 and the MPs 141 can be set in advance. In consideration of the malfunction of any MP 141, the MP 141 may create information indicating the optimal correlation between the BEIF units 204 and the MPs 141 and may store the created information at a position (for example, the storage memory 143 or the register unit 201 in the SVIF unit 123) which can be referred to in the SVIF 123. The MP search table 401 may be distributed into the SVIF 123 and the storage 112 or may be distributed into the SVIF 123 and the server 111, that is, may be disposed in any combination or at any position of the server 111, the SVIF 123, and the storage 112. The destination information may include the chassis number, the cluster number, and the storage port number which are elements of the issuance destination ID.

A process flow which is performed in this embodiment will be described below. In the following description, the SVIF 01 is mentioned as an example, but any of the SVIFs 02 to 08 perform the same process flow. In this embodiment, an initialization process is performed. By this initialization process, the MP search table 401 is prepared and the computer system can start an I/O operation. Thereafter, any server 111 can issue an I/O request and can store I/O target data corresponding to the I/O request in an I/O destination VOL. The I/O target data stored in the I/O destination VOL is actually recorded on one or more PDEVs. In this embodiment, for the purpose of convenience of explanation, it is assumed that the I/O target data stored in one VOL is stored in one PDEV.

Figure 5:
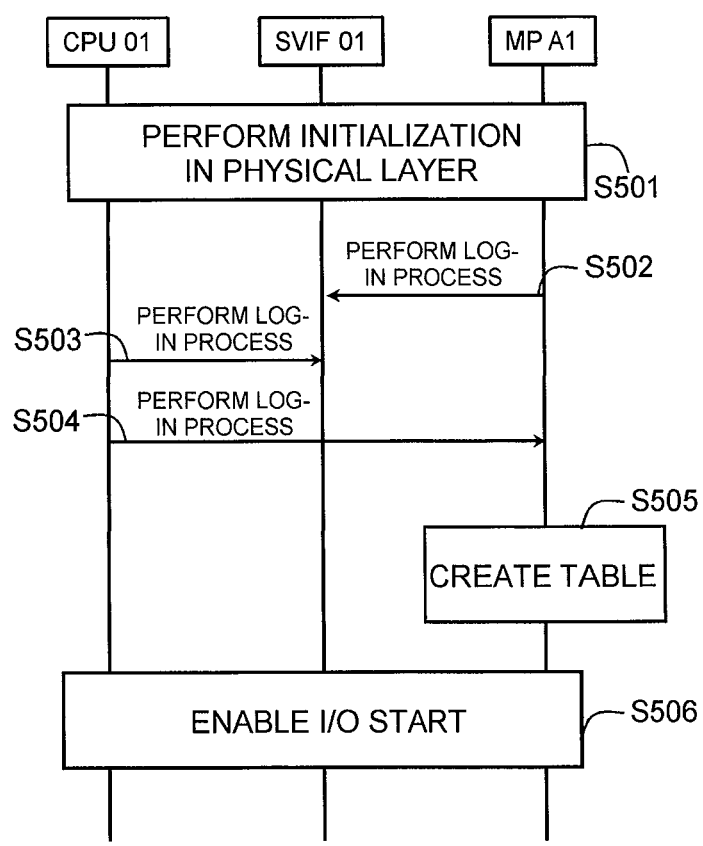
FIG. 5 is a diagram illustrating an initialization process flow.

FIG. 5 is a diagram illustrating an initialization process flow.

Initialization in a physical layer is performed so that communication in the physical layer is enabled between the server 01 and the CTL A (S501). Since this initialization is the same as general initialization in a physical layer in communications, details thereof will not be described. The process between the server 01 and the CTL B is not illustrated.

After the initialization in a physical layer is completed, the MP A1 connected to the SVIF 01 performs a log-in process on the SVIF 01 (S502). The CPU 01 (for example, VM) performs a log-in process on the SVIF 01 (S503). In this log-in process, the CPU 01 transmits issuance source IDs, which can be designated, to the SVIF 01. The server performs a log-in process on the storage 112 (S504) after the log-in process (S503) on the SVIF 01 is completed.

For example, after a user creates an LU through the use of a general LU setting mechanism, the storage, the created LU and the server are correlated with each other through the initialization process of the server, and the server identifier is correlated with the VOL control information managed in a memory shared by all the MPs 141 of the storage 112, the MP A1 creates the MP search table 401 on the basis of the correlations (S505) and stores at least the first sub table 411 of the MP search table 401 in the register unit 201 of the SVIF 01. The control unit 213 of the SVIF 01 can correlate the MPs 141 and the BEIF units 204 with each other as described above. The control unit 213 may create a path management table (FIG. 14) on the basis of the correlation information of the MPs 141 and the BEIF units 204 and may store the created path management table in the register unit 201. The path management table may show the correlation of the BEIF units 204 with the MP numbers. From what BEIF unit 204 an I/O command for what MP should be transmitted may be specified on the basis of the path management table. As described above, the port numbers and the MP numbers may be correlated with each other without using a table.

By causing the server 01 and the CTL A to perform predetermined processes therebetween after creating the MP search table 401, the computer system can start an I/O processing flow (S506).

Figure 6:
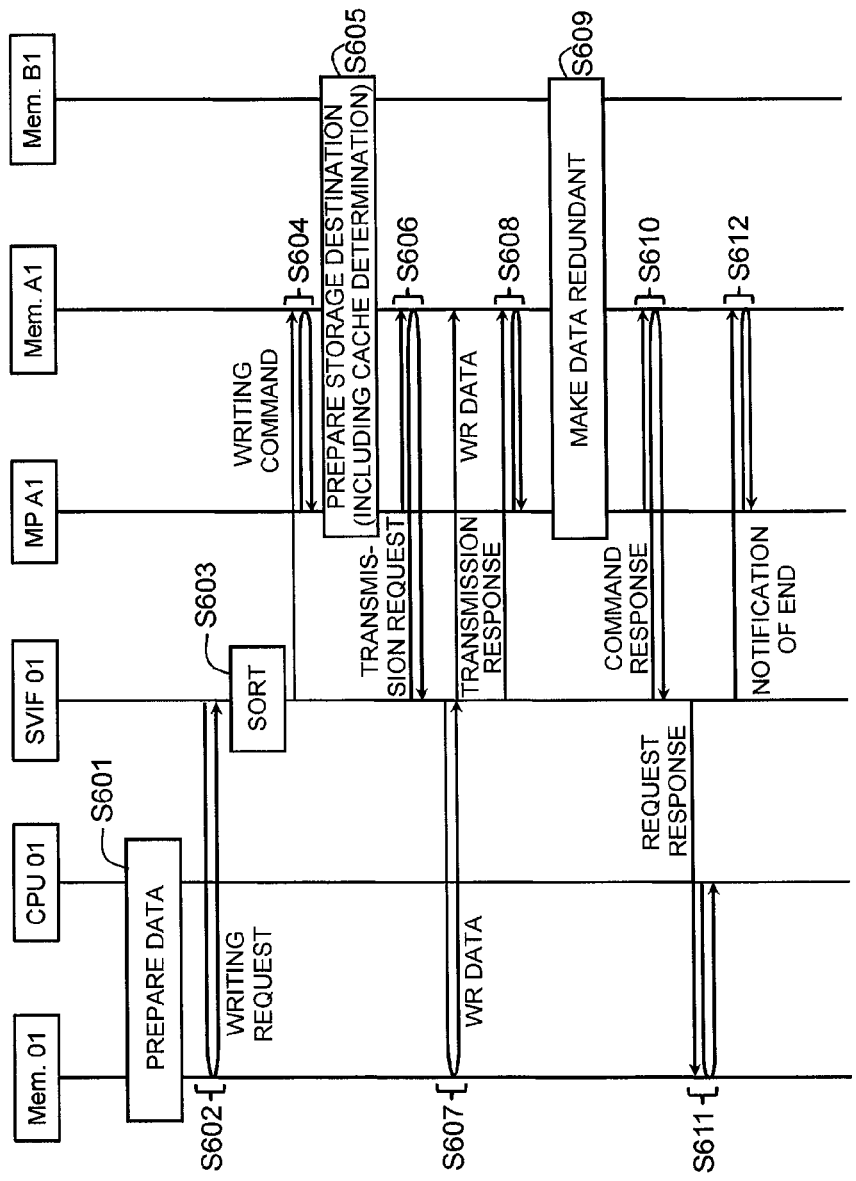
FIG. 6 is a diagram illustrating a writing process flow according to Embodiment 1.

FIG. 6 is a diagram illustrating a writing process flow.

Data is prepared (S601). Specifically, the CPU 01 (VM) stores a writing request and WR data in the server memory 01. The writing request includes an issuance source ID. The DMA unit 212 of the SVIF 01 acquires the writing request from the server memory 01 (S602). The writing request may be temporarily stored in the register unit 201. The writing request includes a server ID of an issuance source, a transmission source address indicating a storage destination of writing data, and an LUN of a writing data storage destination. A method of designating the transmission source address is not limited and a pointer of a memory address on the server side storing the transmission source address may be used. The storage destination of writing data may be distributed to plural areas. In this case, a list structure (for example, a list structure including plural transmission source addresses, a list structure including a transmission source address and a pointer in which a next address is stored, a list structure including a transmission source address and a pointer indicating an address in which a pointer of a next transmission source address is stored, or a list structure including a pointer of a transmission source address and a pointer indicating an address in which a pointer of the transmission source address is stored) which can designate plural areas (destinations) may be included in the writing request. The SVIF 01 may acquire the transmission source address of data depending on the list structure at any timing until actually transmitting data.

The sorting unit 211 of the SVIF 01 performs a sorting process (S603). In the sorting process, the sorting unit 211 specifies a target MP A1 from the MP search table 401 using the issuance source ID of the writing request and the LUN of the writing request and determines from which of two BEIF units 204 to transmit a writing command. The writing command may include an issuance destination ID including the number of the specified MP A1 and may be stored a writing command processing wait memory area (for example, queuing memory) for the MP A1. The writing command may be stored in the register unit 201. The DMA unit 212 of the SVIF 01 transmits the writing command to the storage memory A1 (for example, the writing command processing wait memory area (for example, queuing memory) for the MP A1) of the MP A1 via the determined BEIF unit 204, and the target MP A1 acquires the writing command from the storage memory A1 (S604). The writing command includes information (for example, LUN, VOL number, and LBA) of the writing destination. The MP A1 prepares a storage destination (S605). For example, the MP A1 performs cache determination on whether data having the same writing destination as the writing destination specified from the writing command is cached in the storage memory A1, and reserves a cache area from the storage memory A1 (and the redundant memory B1 thereof) depending on whether the determination result is positive or negative.

The MP A1 stores a transmission request in the storage memory A1, and the DMA unit 212 of the SVIF 01 acquires the transmission request from the storage memory A1 (S606). The transmission request includes a transmission destination address of the WR data, or a pointer for specifying the transmission destination address, or both thereof. The transmission destination address of the WR data is an address of the cache area reserved in the storage memory A1. The address of the cache area in the storage memory B1 of a redundancy destination may be notified to the SVIF 01 and the transmission process may be covered (that is, the SVIF 01 may store the WR data in the cache area in the storage memory B1). The DMA unit 212 of the SVIF 01 specifies the transmission source address, which is acquired from the server by the SVIF 01, from the command ID of the transmission request and transmits the WR data from the area (area in the server memory 01) indicated by the transmission source address to the area (area in the storage memory A1) indicated by the transmission destination address of the transmission source request (S607). Accordingly, the WR data is stored in the cache area reserved in the storage memory A1. The transmission source address and the transmission destination address necessary for causing the SVIF 01 to process the writing request may be divided into plural pieces and then may be transmitted and received. For example, a list structure (Scatter Gather List) including a pointer in a memory in which the divided address information and a pointer of next address information are stored or a list structure including the divided address information and a pointer of next address information may be employed.

The DMA unit 212 of the SVIF 01 stores a transmission response (response to the transmission request) in the storage memory A1 and the MP A1 acquires the transmission response from the storage memory A1 (S608). The MP A1 copies the WR data in the storage memory A1 to the cache area reservedsecured in the redundant memory A1 (S609). The SVIF 01 may write data to both of the storage memory A1 and the redundant memory A1. In this case, the acquisition of the transmission response (S608) is performed after the redundancy of data (S609). The MP A1 stores a command response (a response to the writing command) in the storage memory A1 and the DMA unit 212 of the SVIF 01 acquires the command response from the storage memory A1 (S610). The DMA unit 212 of the SVIF 01 transmits (stores) a request response (a response to the writing request) to (in) the server memory 01, and the CPU 01 acquires the request response from the server memory 01 (S611). The SVIF 01 notifies the MP A1 that the command response processing is completed (S612).

The SVIF 123 may perform calculation, application, check, and deletion of a data integrity field (DIF) or the like which is used as a data securing code for a storage. In this case, the processes may be performed by the internal processor 202. The DIF calculation and application at the time of writing may be performed, for example, when the SVIF 01 reads data from the server memory 01 in S607.

Figure 7:
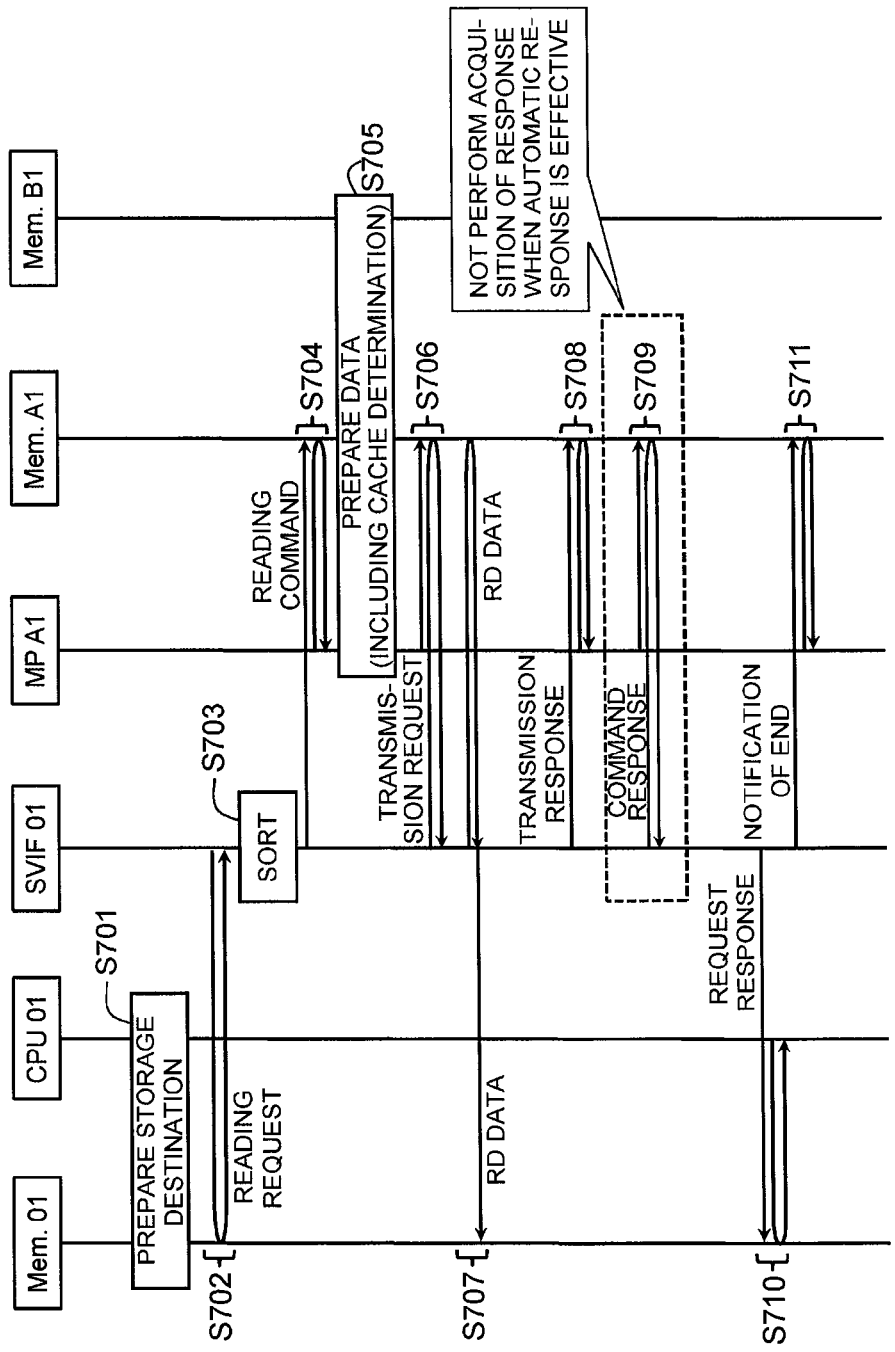
FIG. 7 is a diagram illustrating a reading process flow according to Embodiment 1.

FIG. 7 is a diagram illustrating an example of a reading process flow.

A storage destination is prepared (S701). Specifically, the CPU 01 (VM) stores a reading request in the server memory 01. The reading request includes an issuance source ID. The DMA unit 212 of the SVIF 01 acquires the reading request from the server memory 01 (S702). The reading request may be temporarily stored in the register unit 201. A transmission destination address in which the read data is stored may be included in the reading request. The format of the transmission destination address may be similar to the format of the transmission destination address of the writing data. The SVIF 01 may acquire the transmission destination address of the data depending on the list structure at any timing until actually transmitting data.

The sorting unit 211 of the SVIF 01 performs a sorting process (S703). In the sorting process, the sorting unit 211 specifies a target MP A1 from the MP search table 401 using the issuance source ID of the reading request and the LUN of the reading request and determines from which of two BEIF units 204 to transmit a reading command. The sorting unit also determines in which of memories taken charge of the MP A1 and the MP A2 to store the reading command. The reading command may include an issuance destination ID including the number of the specified MP A1 and may be stored a reading command processing wait memory area (for example, queuing memory) for the MP A1. The reading command may be stored in the register unit 201. The DMA unit 212 of the SVIF 01 transmits (stores) the reading command to (in) the storage memory A1 (for example, the reading command processing wait memory area (for example, queuing memory) for the MP A1) of the MP A1 via the determined BEIF unit 204, and the target MP A1 acquires the reading command from the storage memory A1 (S704). The reading command includes information (for example, LUN, VOL number, and LBA) of the reading source. The MP A1 prepares data (S705). For example, the MP A1 performs cache determination on whether RD data of the reading source specified from the reading command is cached in the storage memory A1, and reserves a cache area from the storage memory A1 (and the redundant memory A1 thereof) depending on whether the determination result is positive or negative. When the determination result is negative, the MP A1 reservessecures the cache area in the storage memory A1, read the RD data from the PDEV 132 serving as a basis of the reading source, and stores the read RD data in the reserved cache area.

The MP A1 stores a transmission request in the storage memory A1, and the DMA unit 212 of the SVIF 01 acquires the transmission request from the storage memory A1 (S706). The transmission request includes a transmission source address of the RD data, or a pointer for specifying the transmission source address, or both thereof. The transmission source address of the RD data is an address of the cache area reserved in the storage memory A1. The DMA unit 212 of the SVIF 01 specifies the transmission destination address, which is acquired from the server by the SVIF 01, from the command ID of the transmission request and transmits the RD data from the area (area in the storage memory A1) indicated by the transmission source address to the area (area in the server memory 01) indicated by the transmission destination address (S707). Accordingly, the RD data is stored in the cache area reserved in the server memory 01. The DMA unit 212 of the SVIF 01 stores a transmission response in the storage memory A1, and the MP A1 acquires the transmission response from the storage memory A1 (S708). The MP A1 stores a command response (a response to the reading command) in the storage memory A1, and the DMA unit 212 of the SVIF 01 acquires the command response from the storage memory A1 (S709). The DMA unit 212 of the SVIF 01 stores a request response (a response to the reading request) in the server memory 01, and the CPU 01 acquires the request response from the server memory 01 (S710). The transmission source address and the transmission destination address necessary for causing the SVIF 01 to process the reading request may be divided into plural pieces and then may be transmitted and received. For example, a list structure (SGL) including a pointer in a memory in which the divided address information and a pointer of next address information are stored or a list structure including the divided address information and a pointer of next address information may be employed. The SVIF 01 notifies the MP A1 that the command response processing is completed (S711).

The SVIF 123 may perform calculation, application, check, and deletion of a data integrity field (DIF) or the like which is used as a data securing code for a storage. In this case, the processes may be performed by the internal processor 202. The DIF check and deletion at the time of reading may be performed, for example, when the SVIF 01 reads data from the storage memory A1 in S707.

In this embodiment, an auto response may be employed. The auto response is a similar response as if a transmission request is a request. When the auto response is employed, a special transmission request is issued instead of the above-mentioned transmission request. The special transmission request is a transmission request correlated with a value indicating the auto response. The special transmission request includes information for creating a command response. Specifically, the special transmission request issued by the MP A1 is acquired by the SVIF 01, and the SVIF 01 stores the request response in the server memory 01 when the transmission request is recognized to be a special transmission request and DMA transmission of the RD data is completed. That is, when the transmission request in S706 is a special transmission request, the process of S709 is not performed after S707, but the process of S710 is performed. The acquisition of the transmission response (S708) may be performed before or after the acquisition of the command response (S709) in order to notify that the transmission is normally completed. A counter indicating that the transmission form the SVIF 01 is completed may be provided and the MP A1 may refer to the counter or the like if necessary. Accordingly, it is possible to perform the reading process at a higher speed in comparison with a case where the auto response is invalid. At the time of transmitting the WR data by DMA, similarly, the acquisition of the command response (S610) is not performed but the request response may be issued (S611) after the SVIF 01 performs redundancy of data (S609). At this time, the acquisition of the transmission response (S608) may be performed before or after the acquisition of the request response (S611). A counter or the like indicating that the transmission form the SVIF 01 is completed may be provided and the MP A1 may refer to the counter or the like if necessary. When the auto response is employed and the SVIF 01 returns the request response to the MP A1 after the CPU 01 issues the command response, the notification of completion may be included in the request response.

In the reading process and the writing process, the MP may determine whether the auto response is employed.

According to Embodiment 1, the SVIF 123 specifies the target MP 141 and transmits the I/O command for designating the target MP 141. This system is an integrated system in which the server and the storage are connected to each other via a broadband bus. Therefore, the SVIF 123 can refer to the information for specifying the MP 141 side at the time of sending a command, and can send the command to the specified MP. Accordingly, plural servers 111 can be connected to the storage 112 without using a network switch. Each SVIF 123 is provided with a path (physical path) connected to the MP of the CTL A and a path (physical path) connected to the MP of the CTL B, and each SVIF 123 transmits an I/O command via the other path when one path malfunctions. In this case, even when the MP (for example, the MP B1) is a target MP (for example, the MP A1) of the I/O command, the MP is a redundant MP of the target MP and thus can process the I/O command. In this regard, the sorting destination MP in the MP search table 401 may be rewritten. When the MP numbers in the second sub table 412 are virtualized as described above and the third sub table is prepared, for example, the second sub table may not be updated by rewriting the real MP numbers in the third sub table, thereby reducing a table updating load. By storing all or a part (for example, the second sub table 412) of the MP search table 401 in both of the storage memory A1 and the storage memory B1 in synchronization with each other and switching a reference destination of the MP search table 401 from the storage memory A1 as the reference destination before failure to the storage memory B1 when the CTL A fails, the SVIF 01 can acquire information from the MP search table 401 (for example, the second sub table 412) of the storage memory B1 and can continue to perform an appropriate MP sorting process.

According to Embodiment 1, the transmitted I/O command may include the processor number of the target MP and may be stored in a command processing wait memory area (for example, a queuing memory) correlated with the target MP out of plural command processing wait memory areas correlated with plural MPs (MP numbers). In the latter, the I/O command includes the number of the MP connected to the destination port (storage port), but may not include the process number of the target MP. The plural command processing wait memory areas correlated with the plural MPs (MP numbers) are disposed in the memory of the transmission destination (for example, the storage memory A1 or A2), and the I/O command is stored in the command processing wait memory area correlated with the target MP out of the plural command processing wait memory areas by the I/F of the transmission source (for example, the sorting unit 211 of the SVIF 01). Accordingly, the I/F of the transmission source may store information (for example, an address map) indicating the correlation between the processor numbers of the MPs and the addresses of the command processing wait memory areas (the addresses in the memory of the transmission destination) and the command processing wait memory area of the transmission destination may be specified on the basis of the information. The command processing wait memory area of each MP may include command processing wait memory areas by command types such as a writing command processing wait memory area and a reading command processing wait memory area and may be an area common to plural command types.

Embodiment 2

Hereinafter, Embodiment 2 will be described. Here, differences from Embodiment 1 will be mainly described and common points to Embodiment 1 will not be described or will be described in brief.

In Embodiment 2, the storage 112 (storage control module 113) is scaled out. Specifically, K storage control modules 113 are connected in series (in multiple stages) and the first storage control module 113 of the K storage control modules 113 can be connected to N servers 111 (where N is an integer of 2 or more, for example, N=8). For example, P chasses 101 (where P is an integer of 2 or more) may be provided and each chassis 101 may include at least one storage control module. By connecting the STIFs 144 to each other, the K storage control modules 113 in the P chasses 101 can be connected in series (in multiple stages).

While K=1 (and P=1) is set in Embodiment 1, K may be an integer of 2 or more and K=2 is set in Embodiment 2. Embodiment 2 will be described below in detail. In the below description, when an expression of "n-th storage control module" is used, the value of n is the smallest in the head storage control module (n=1) and is the largest in the tail storage control module (n=K=2).

Figure 8:
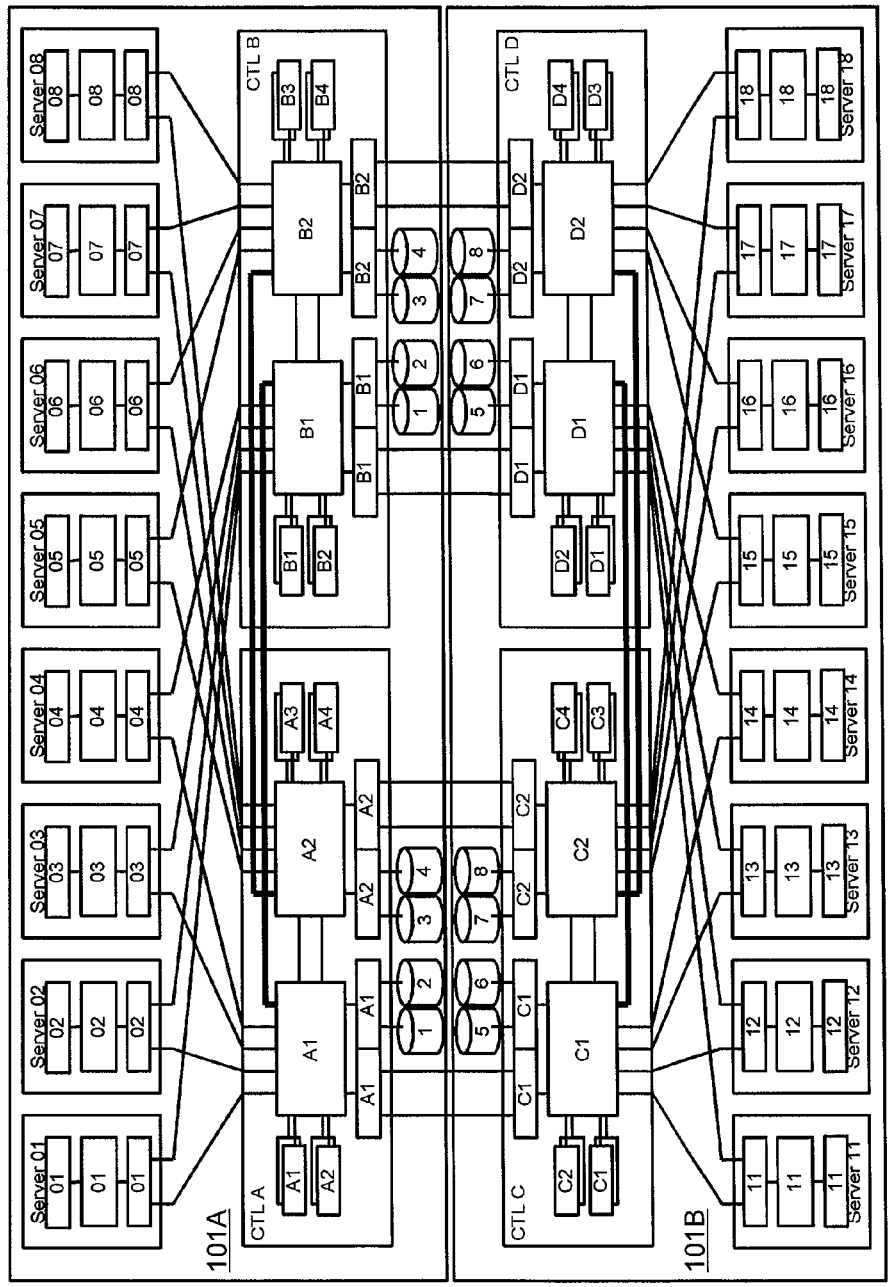
FIG. 8 is a diagram illustrating a configuration of a computer system according to Embodiment 2.

FIG. 8 is a diagram illustrating a configuration of a computer system according to Embodiment 2. In FIG. 8, the storage ports are not illustrated. Reference signs other than the reference signs of the chasses are also not illustrated.

The computer system is constructed by scaling out a computer subsystem including the storage control modules. One computer subsystem includes plural elements in one chassis 101. In this embodiment, two chasses (computer subsystem) having the configuration described in Embodiment 1 are provided and the STIFs in the two chasses (hereinafter, referred to as first and second chasses) 101A and 101B are connected to each other. In FIG. 8, serial numbers of the elements in the first chassis 101A are the same as in Embodiment 1 and the serial numbers of the elements in the second chassis 101B are numbers not overlapping with the serial numbers of the elements in the first chassis. In the second chassis 101B, the storage control module (dualized CTLs C and D) are connected to eight servers 11 to 18. The STIFs A1, A2, B1, and B2 in the first chassis 101A are connected to the STIFs C1, C2, D1, and D2 in the second chassis 101B, respectively. The configuration of the STIF 144 is the same as the configuration of the SVIF 123. Accordingly, two BEIF units 204 of one STIF 144 are connected to two BEIF units 204 of another STIF 144, respectively. The STIFs 144 of other two storage control modules may be connected to two BEIF units 204 of one STIF 144. In the below description, the (n+1)-th storage control module with respect to the n-th storage control module (or the first storage control module with respect to the server 111) may be referred to as a "subsequent module". The (n−1)-th storage control module with respect to the n-th storage control module (or the server 111 with respect to the first storage control module) may be referred to as a "previous module". The first storage control module in the servers 01 to 08 is a storage control module including CTLs A and B, and the first storage control module in the servers 11 to 18 is a storage control module including CTLs C and D.

In connection of the STIFs, the CTL A may be connected to the CTL D and the CTL B may be connected to the CTL C, in addition to connection of the CTL A and the CTL C and connection of the CTL B and the CTL D. The number of ports to be connected may be any number.

An MP 141 of the subsequent module performs a log-in process on the SVIF 123 via the previous module. For example, the MP C1 creates the MP search table 401 and may transmit all or a part (for example, the second sub table 412) of the created MP search table 401 to the storage memory A1 via the STIF C1 and the STIF A1 or may transmit all or a part (for example, the first sub table 411) of the created MP search table 401 to the SVIF 01 via the STIF C1, the STIF A1, and the storage port connected to the MP A1. The destination information in the MP search table 401 (the second sub table 412) may include information on the VOL taken charge of by the MP C1. The MP C1 can create the MP search table 401, as in the MP A1 of the previous module. That is, the MP C1 in the second storage control module can provide the information on the VOL taken care of by the MP C1 to the server 01 via the first storage control module. That is, the previous MP search table 401 and the MP search table 401 for searching for the subsequent MPs are stored in at least one of the SVIF 01 and the storage memory A1. An MP search table 401 in which the MP search tables 401 are merged may be created. The SVIF 01 performs a sorting process so that a target MP is set to the MP C1 for an I/O command of which the I/O destination is the VOL specified by the MP C1. The SVIF 01 may receive information from the storage 112 and may create or update the MP search table 401, and the STIF C1 may receive information from the storage 112 and may create or update the MP search table 401. The same MP search table 401 may be stored in plural areas of the previous and subsequent storage memories and they may be synchronized with each other.

In the STIFs 144 connected to each other, the other STIF 144 receiving an I/O command or I/O target data from one STIF (STIF serving as an initiator) may bridge the command or data. For example, in the STIF A1 and the STIF C1, when the STIF A is an initiator, the MP C1 receives an I/O command from the STIF A1 and bridges the I/O command. The bridged I/O command is transmitted to and stored in the storage memory C1.

Figure 9:
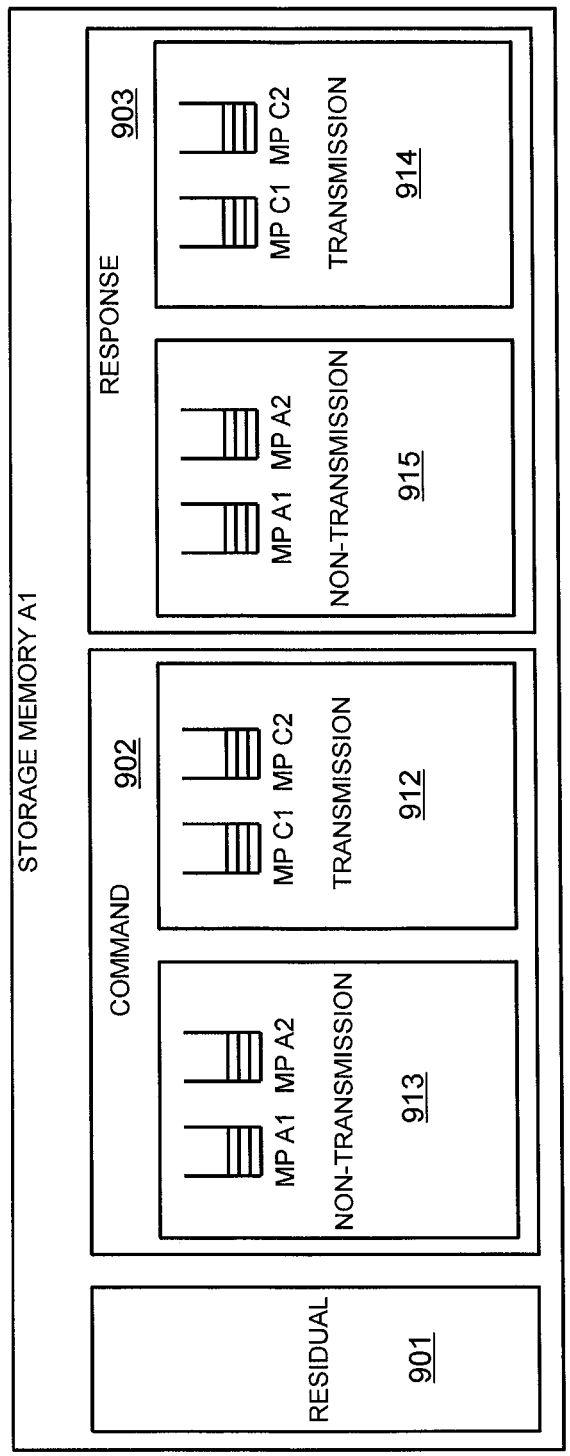
FIG. 9 is a diagram illustrating a configuration of a storage memory according to Embodiment 2.

FIG. 9 is a diagram illustrating a configuration of a storage memory 143 according to Embodiment 2. Here, the storage memory A1 is described as an example.

The storage memory A1 includes a command area 902, a response area 903, and a residual area 901. An I/O command is stored in the command area 902 and a command response is stored in the response area 903. Regarding a transmission request and a transmission response, similarly, the transmission request may be stored in the command area and the transmission response may be stored in the response area. A queuing memory area may be shared by the I/O command and the transmission. For example, the I/O command and the transmission response may be stored in the command area, the I/O response and the transmission request may be stored in the response area, and the queuing memory area may be divided by inbound or outbound with respect to the storage or the like. Other commands such as transmission requests and transmission responses may be stored in the residual area 901, and a control-based requests and responses may be stored in the residual area. A cache area may be reserved in the residual area 901. Control-based information or table information may be stored in the residual area.

The command area 902 includes a non-transmission area 913 and a transmission area 912, and the response area 903 includes a non-transmission area 915 and a transmission area 914, similarly. An I/O command of which a target MP is the MP A1 is stored in the non-transmission area 913, and an I/O response from the MP A1 is stored in the non-transmission area 915. An I/O command (an I/O command which needs to be transmitted to a subsequent module) of which a target MP is not the MP A1 is stored in the transmission area 912, and a request of the I/O command of which a target MP is not the MP A1 is stored in the transmission area 914. The MP A1 processes the I/O command stored in the non-transmission area 913. The MP A1 may instruct the DMA unit 212 of the STIF A1 to transmit the I/O command stored in the transmission area 912 to a subsequent module. Alternatively, the I/O command in the transmission area 912 may be acquired by polling from the STIF 144 of the subsequent module. The MP A1 may instruct the DMA unit of the SVIF 01 to transmit a response, or the response may be acquired by polling form the SVIF. In this way, the I/F (the SVIF 123 or the STIF 144) transmitting and receiving. the I/O command and the response, instead of the MP 141 receiving the I/O command and the response, determines whether to transmit the I/O command. Accordingly, it is possible to reduce the transmission load of the subsequent module or the transmission process from the subsequent module. The SVIF 123 determines whether via what CTL 131 to issue the I/O command to a target MP in a subsequent stage with reference to the MP search table 401 indicating what MP to sort. The MP A1 (any of the MP A1 and the MP A2 may perform processing as a representative of the MPs and each thereof may perform processing) perform queue initialization at the time of adding a subsequent storage (storage control module), recognizes that the MP C1 and the MP C2 are present in the queue initialization, and creates a transmission queue (for example, a command processing wait memory area correlated with the MP C1) in which the I/O command from the SVIF 01 is transmitted to the MP C1 in the storage memory A1 (or A2). When the SVIF 01 accesses the MP C1, setting for correlation with the transmission queue processed by the MP A1 is performed on the SVIF 01. Accordingly, the SVIF 01 recognizes the transmission queue for the MP C1. Similarly, for example, when accessing the MP D1, setting for correlation with the transmission queue of the MP B1 is performed on the SVIF 01. Here, the setting may be performed representatively by the MP A1, may be performed representatively by the MP B1, or may be performed by each MP. Accordingly, it is determined from what port to use. When the queue is recognized, a log-in process of the MP C1 on the SVIF 01 is performed and the port number or the like is exchanged between the MP C1 and the SVIF 01. The MP C1 creates the MP search table 401, causes the MP A1 to allocate an area of the MP search table 401 for the MP C1 as a memory area in which the MP search table 401 for the MP A1 is stored so that the SVIF 01 refers to the MP search table 401 for the MP C1, and sets the MP search table 401 in the reserved memory area. In the MP search table 401 set by the MP C1, what MP (C1 or C2, registration may be performed representatively by any of C1 and C2 or may be performed by each thereof) to take charge of access of the server 01 to what VOL of the subsequent storage is set. The MP search tables 401 for the MPs D1 and D2 may be set by the MP B1 (or B2), or may be set representatively by the MP C1 (or C2). When the MP search table is set by the MP B1 (or B2), the MP B1 (or B2) may copy the MP search table to the same memory as a memory storing another MP search table 401. The same MP search table 401 may be stored in plural areas, for example, the same MP search table 401 may be stored in the CTL A and the CTL B so as to be synchronized with each other, or the MP search table may be set (or updated) in one area and then may be copied to the other area for setting (or updating). In the above-mentioned example, the MP search table for the MP C1 (or C2) may be set in the storage memory of the CTL A, the MP search table for the MP D1 (or D2) may be set in the storage memory of the CTL B, both may be copied, and all the same MP search tables may be finally registered in the storage memory of the CTL A and the storage memory of the CTL B. Alternatively, the MP search tables for the MP C1 (or C2) and the MP D1 (or D2) may be set in the storage memory of the CTL A and the MP search tables may be copied to the CTL B. In this course, the setting and the copying of the MP search table 401 may be performed by one or more MPs in at least one of the CTL as a copy source and the CTL as a copy destination. The transmission process may be performed by the MPs in charge of the corresponding transmission queues. Accordingly, when the SVIF 01 accesses the VOL of the subsequent storage, the I/O command is set in the queue of the MP C1 via the MP corresponding to the processor number of the issuance destination ID. The queue of the MP C1 may be set in the transmission area. Accordingly, the SVIF can uniquely designate the MP to process the I/O command by sorting and it is thus possible to suppress an increase in latency due to passing through a long path and an increase in use bandwidth due to occupying of an unnecessary path and to reduce an MP load due to unnecessary passing to another MP. The STIF A1 (or A2) of the CTL A and the STIF B1 (or B2) of the CTL B may be connected to each other and the sorting process may be performed by at least one of the STIFs A1, A2, B1, and B2. In this case, the sorting to D1 (or D2) is set in the transmission area of A1 (or B1) by the sorting in the previous stage.

In the configuration in which storage control modules are connected in series (in multiple stages), the I/O command and the I/O target data are transmitted by DMA. Accordingly, by directly connecting the server, the previous storage, and the subsequent storage by PCIe, the MP can transmit data with a low load, a small overhead in a protocol process, and low latency, similarly to the previous storage control module. It is possible to add resources of a storage and a server while maintaining a broadband. Therefore, it is possible to expect an increase in I/O speed with low latency and a broadband even when servers and storages are scaled out.

Figure 10:
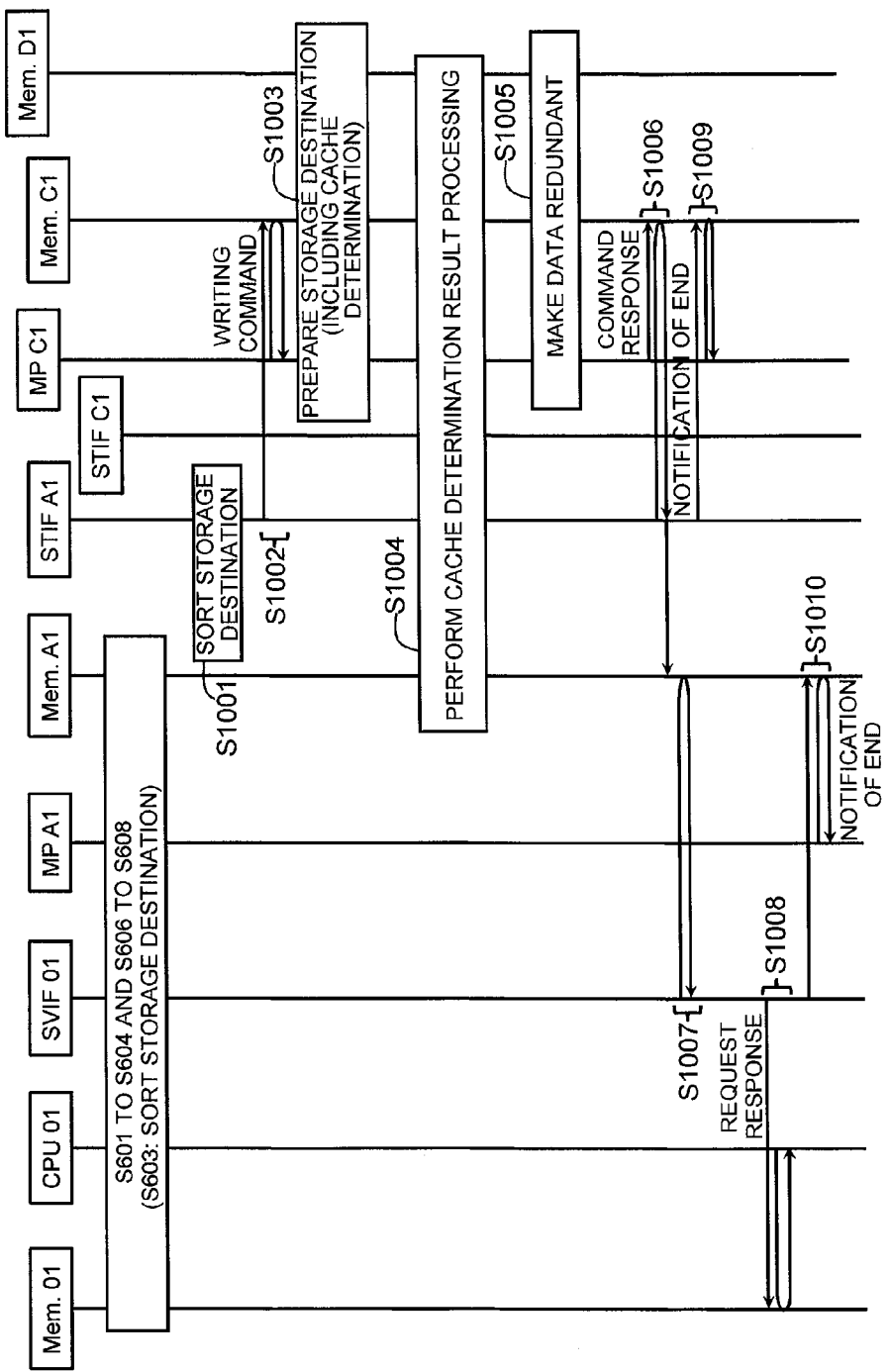
FIG. 10 is a diagram illustrating a writing process flow according to Embodiment 2.

FIG. 10 is a diagram illustrating a writing process according to Embodiment 2.

By performing the same processes as in S601 to S604 and S606 to S608 in FIG. 6, a writing command and WR data are stored in the storage memory A1. In the sorting process according to this embodiment, the sorting unit 211 of the SVIF 01 determines whether a target MP is present in the first storage control module, on the basis of the chassis number of the issuance destination ID including the number of the target MP (see FIG. 3). When the determination result is positive, the sorting unit 211 determines that the storage destination of the writing command is the non-transmission area 913 in the storage memory A1. When the determination result is negative, the sorting unit 211 determines that the storage destination of the writing command is the transmission area 912 in the storage memory A1. The MDA unit 212 of the SVIF 01 stores the writing command on the basis of the determination result. The register unit 201 of each SVIF (and each STIF) stores the chassis number of the subsequent module and the SVIF 01 can determine whether the target MP is present in the subsequent module, depending on whether the chassis number of the issuance destination ID is stored in the registered unit 201 of the SVIF 01. The register unit 201 of each STIF (and each SVIF) may not store the chassis number of the subsequent module, but the sorting unit 211 of each STIF (and each SVIF) may transmit an I/O command to the subsequent module when the I/O command not including its own chassis number but including a chassis number not stored therein is received.

When the writing command is stored in the non-transmission area 913 in the storage memory A1, the writing process ends in the same flow as in Embodiment 1.

When the writing command is stored in the transmission area 912 in the storage memory A1, the DMA unit 212 of the STIF A1 acquires the writing command from the transmission area 912 in the storage memory A1 and the sorting unit 211 of the STIF A1 determines whether the target MP is present in the subsequent module on the basis of the chassis number in the issuance destination ID of the writing command (S1001). When the determination result is positive (for example, when the target MP is the MP C1), the sorting unit 211 determines that the storage destination of the writing command is the non-transmission area 913 in the storage memory C1. When the determination result is negative, the sorting unit 211 determines that the storage destination of the writing command is the transmission area 912 in the storage memory C1. Here, it is assumed that the storage destination of the writing command is determined to be the non-transmission area 913. The DMA unit 212 of the STIF A1 transmits (stores) the writing command to (in) the non-transmission area 913 in the storage memory C1 via the STIF C1 on the basis of the determination result and the MP C1 acquires the writing command from the non-transmission area 913 in the storage memory C1 (S1002). Then, the storage destination is prepared (S1003). For example, the target MP C1 performs cache determination on whether data having the same writing destination is cached in the storage memory C1. Reservation of the cache area and DMA transmission of the WR data are performed depending on the cache determination result (cache determination result processing) (S1004). Accordingly, the WR data is stored in the cache area reserved in the storage memory C1. The MP C1 copies the WR data to the cache area reserved in the redundant memory D1 of the storage memory C1 (S1005). The STIF A1 and the STIF D1 in FIG. 8 may be crossed and connected to each other and the process of making data redundant (S1005) may be performed by the STIF A1. Thereafter, the MP C1 stores a command response in the storage memory C1, and the STIF A1 acquires the command response from the storage memory C1 and stores the acquired command response in the storage memory A1 (S1006). The SVIF 01 acquires the command response from the storage memory A1 (S1007). Then, the SVIF 01 stores a request response in the server memory 01 and the CPU 01 acquires the request response from the server memory 01 (S1008). The flow of S1004 is the same process flow of S605 to S608 and varies depending on whether the request is a request from the server of the front end or a request from the storage of the back end. FIG. 6 illustrates an example of cache miss. In order to distinguish the front end process and the back end process, the request or the response or the like may be stored in different processing wait memory areas (for example, queuing memories) or an identifier for distinction may be set in the request or the response.

Figure 11:
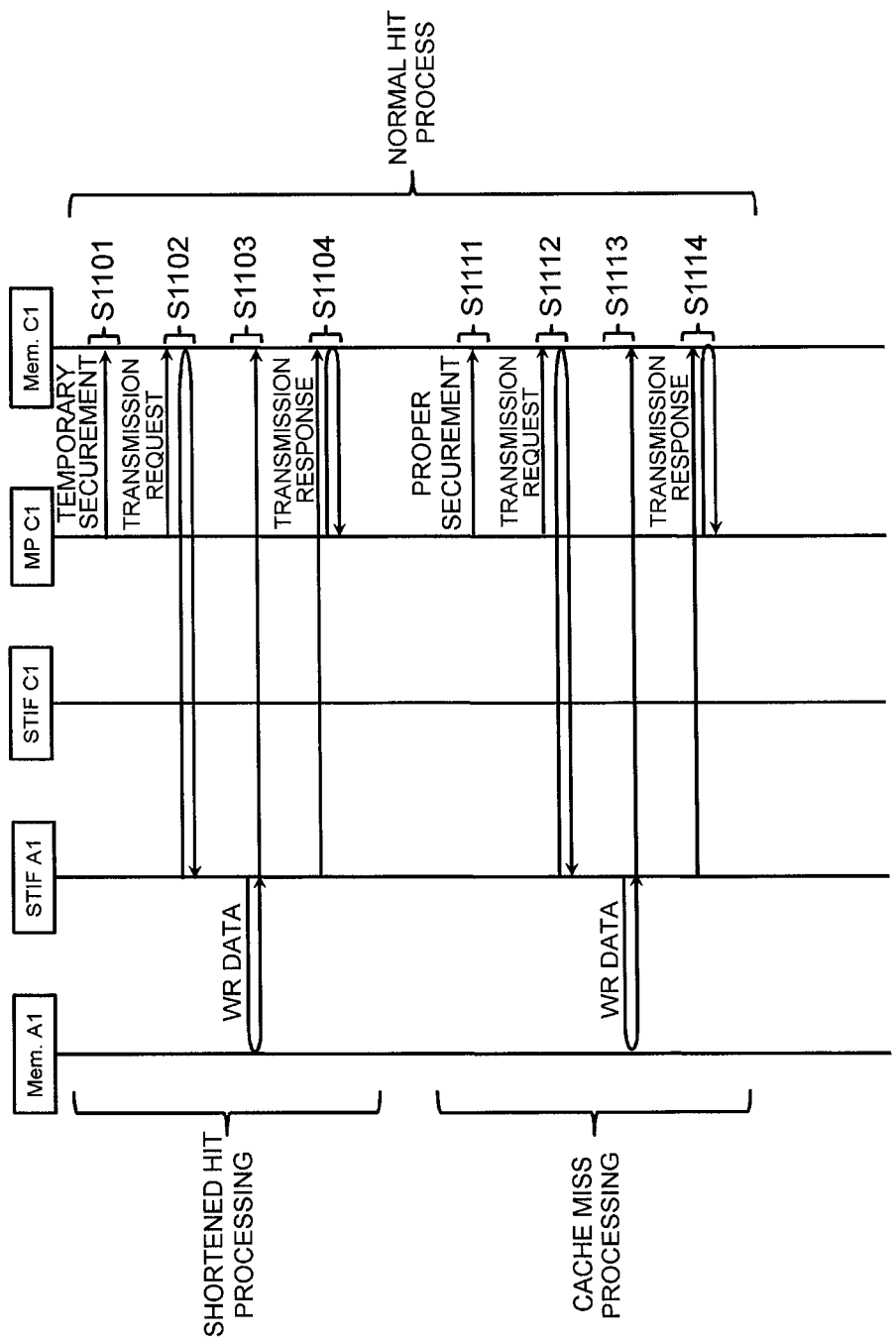
FIG. 11 is a diagram illustrating details of a cache determination result processing flow.

FIG. 11 is a diagram illustrating details of cache determination result processing.

The cache determination result processing is classified into cache hit processing which is performed when a cache is hit (when the cache determination result is positive) and cache miss processing which is performed when a cache is missed (when the cache determination result is negative). The cache hit processing includes normal hit processing and shortened hit processing. The normal hit processing is a process including all the processes illustrated in FIG. 11 and the shortened hit processing and the cache miss processing are a partial process of the normal hit processing.

In the normal hit processing, the following processes are performed. That is, the target MP C1 temporarily reserves a cache area from the storage memory C1 (S1101). The temporarily-reserved cache area (hereinafter, referred to as a temporary area) is, for example, an area which is managed as a buffer area. The MP C1 stores a transmission request in the storage memory C1 and the STIF A1 acquires the transmission request from the storage memory C1. In the transmission request, the transmission destination address is an address of the temporary area and the transmission source address is an address of an area (area in which the WR data is stored) in the storage memory A1. The STIF A1 transmits the WR data from the storage memory A1 to the temporary area of the storage memory C1 by DMA in response to the transmission request (S1103) and stores the transmission response to the storage memory C1, and the MP C1 acquires the transmission response from the storage memory C1 (S1104). Thereafter, the same processes of S1101 to S1104 are repeatedly performed. Specifically, the MP C1 properly reserves a cache area from the storage memory C1 (S1111). The reserved cache area is an area in which data having the same writing destination is cached. The MP C1 stores a transmission request in the storage memory C1 and the STIF A1 acquires the transmission request from the storage memory C1 (S1112). The STIF A1 transmits the WR data from the storage memory A1 to the cache area reserved in the storage memory C1 by DMA in response to the transmission request (S1113) and stores a transmission response in the storage memory C1, and the MP C1 acquires the transmission response from the storage memory C1 (S1114). The WR data in S1113 may be transmitted from the area temporarily reserved in the storage memory C1 by DMA, not from the storage memory A1. Accordingly, even when the previous storage malfunctions, it is possible to complete the process flow using data transmitted to the subsequent stage. S1112 to S1114 may be performed by the MP C1. Accordingly, even when the previous storage malfunctions and the STIF C1 is not used, it is possible to complete the process flow using data transmitted to the DMA of the MP C1 and the subsequent stage.

Since two steps of processes are performed in the normal hit processing, data is stored in the temporary area when rewriting data in the cache. Therefore, when the connection between the STIF A1 and the STIF C1 is cut off or the like at the time of overwriting of the cache hit and the writing data is interrupt, it is possible to prevent recovery from a state in which old and new data are mixed from being disabled. Since the cache is shared by plural servers, it is necessary to exclusively control access to the cache when plural I/O commands are simultaneously issued. However, by storing data in the temporary area, it is possible to perform the overwriting process at the timing of the MP C1, thereby facilitating the handling of the process. Data is not actually transmitted in S1103, but data may be transmitted in S1113 after proper reservation. Accordingly, it is possible to enhance a utilization rate of a bandwidth and thus to avoid a problem with the interruption of data. According to the normal hit processing, the data cached in the cache area is updated with the WR data. After the normal hit processing, the MP C1 can store the updated data stored in the cache area in the PDEV before or after issuing the command response.

In the shortened hit processing, the proper reservation of the cache area in the normal hit processing is not performed. That is, the shortened hit processing includes S1101 to S1104 of the normal hit processing and does not include S51111 to S1114 of the normal hit processing. According to the shortened hit processing, the command response can be more rapidly returned in comparison with the normal hit processing. The STIF A1 and the STIF D1 in FIG. 8 may be crossed and connected to each other and the redundancy of data may be performed by the STIF A1. After the shortened hit processing, the MP C1 can store the WR data stored in the temporary area and data (data obtained by updating the cached data with the WR data) based on the data in the area in which data having the same writing destination is cached in the PDEV before or after issuing the command response. At an arbitrary timing, the MP C1 or the STIF A1 may transmit data from the temporarily-reserved area in the storage memory C1 to the properly-reserved area. The target MP may select which of the normal hit processing and the shortened hit processing to performed. For example, when data is stored in a medium of a relatively-high speed such as a flash memory, the shortened hit processing may be selected with an importance on the response. When data is stored in a medium of a relatively-low speed such as an HDD, the normal hit processing may be performed with an importance on the cache hit rather than the response. This is because data is distributed to plural areas and it is thus necessary to hit data in which the data before updating, the data after updating are merged, and thus the hit processing includes a slightly more process. The normal hit processing and the shortened hit processing may be selected depending on the difference between sequential access and random access. The target MP C1 (or another MP (for example, C2)) may select the shortened hit processing when a dirty ratio of the storage memory C1 is less than a predetermined ratio, and may select the normal hit processing when the dirty ratio is equal to or greater than the predetermined ratio. Here, the "dirty ratio" means a ratio of dirty capacity to the capacity of the cache area group. The "dirty capacity" means the total capacity of the dirty cache area (a cache area in which data not stored yet in the PDEV is stored).

In the cache miss processing, the temporal reservation of a cache area in the normal hit processing is not performed. That is, the cache miss processing includes S1111 to S1114 of the normal hit processing but does not include S1101 to S1104 of the normal hit processing. The cache area reserved in the cache miss processing is a free cache area or a clean cache area (a cache area in which only data stored in the PDEV is stored). After the hit or miss processing, the MP C1 can store the WR data stored in the reserved cache area in the PDEV before or after issuing the command response.

Figure 12:
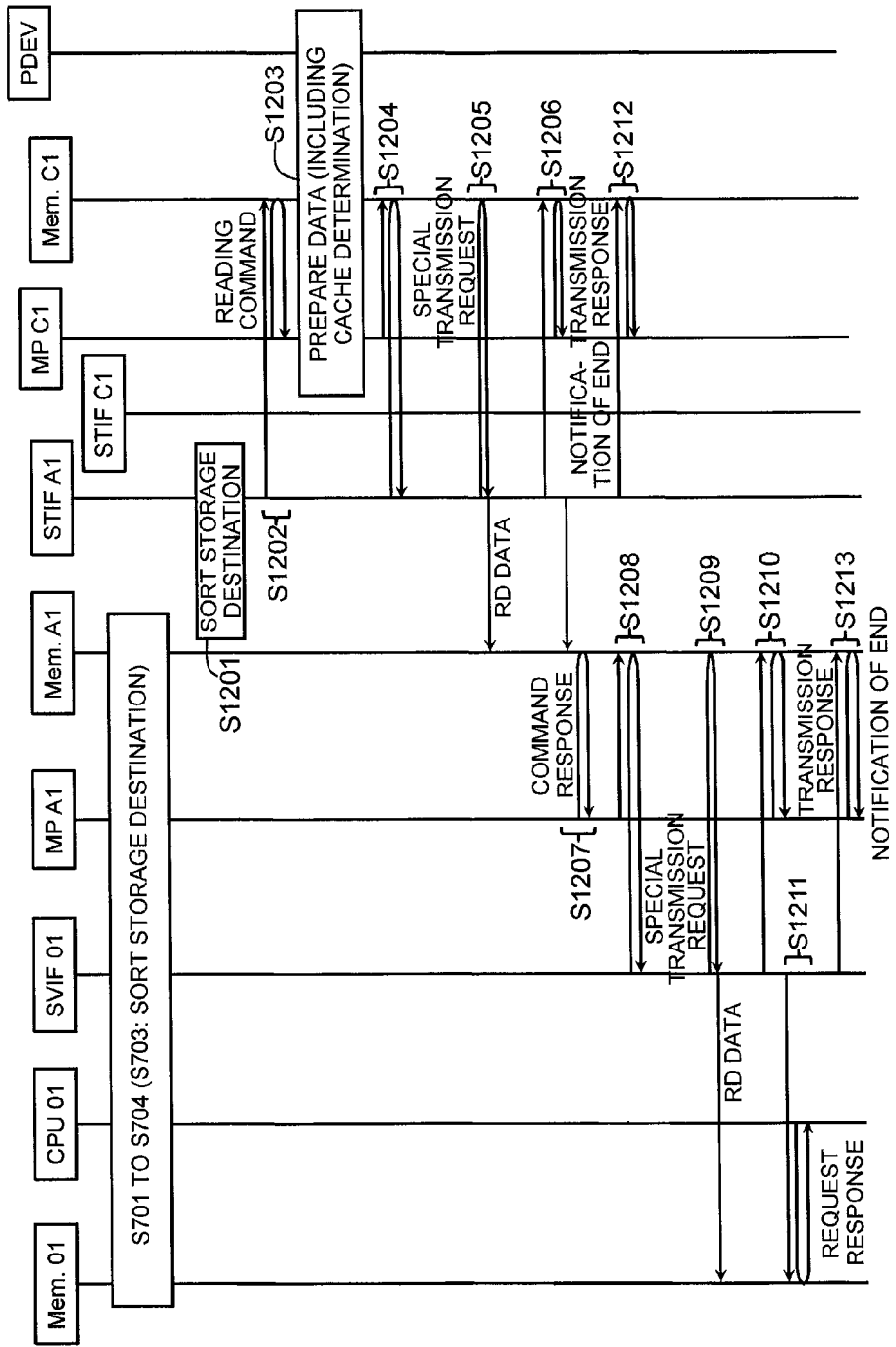
FIG. 12 is a diagram illustrating a reading process flow according to Embodiment 2.

FIG. 12 is a diagram illustrating a reading process flow according to Embodiment 2. In Embodiment 2, an example in which an auto response is employed is described.

A reading command is stored in the storage memory C1, like the writing command in the writing process flow illustrated in FIG. 10. Specifically, the same processes as S701 to S704 in Embodiment 1 are performed. Thereafter, since the module including the target MP C1 is a subsequent module by the sorting process (S1201), the sorting unit 211 of the STIF A1 transmits (stores) the reading command to (in) the non-transmission area 913 of the storage memory C1, and the MP C1 acquires the reading command from the non-transmission area 913 of the storage memory C1 (S1202). Then, data is prepared (S1203). For example, the target MP C1 performs cache determination on whether the RD data is cached in the storage memory C1. When the cache determination result is negative, the MP C1 reserves a cache area in the storage memory C1 and reads the RD data from the PDEV to the cache area. The MP C1 stores a special transmission request in the storage memory C1 and the STIF A1 acquires the special transmission request from the storage memory C1 (S1204). The STIF A1 transmits the RD data by DMA from the cache area of the storage memory C1 to the storage memory A1 in response to the special transmission request (S1205). The STIF A1 stores a transmission response in the storage memory C1 and the MP C1 acquires the transmission response from the storage memory C1 (S1206). The STIF A1 stores a command response in the storage memory A1 and the MP A1 acquires the command response from the storage memory A1 (S1207). The MP A1 stores a special transmission request in the storage memory A1 and the SVIF 01 acquires the special transmission request from the storage memory A1 (S1208). The SVIF 01 transmits the RD data by DMA from the storage memory A1 to the server memory 01 in response to the special transmission request (S1209). The SVIF 01 stores a transmission response in the storage memory A1 and the MP A1 acquires the transmission response from the storage memory A1 (S1210). The SVIF 01 stores a request response in the server memory 01 and the CPU 01 acquires the request response from the server memory 01 (S1211).

A case where K=2 is set (two storage control modules are provided) has been described above, but even when K is an integer of 3 or greater, the flow of commands and data between the server 111 and the target MP is the same. That is, commands and data are transmitted between the server 111 and the target MP by DMA. Specifically, the transmission module is sequentially shifted to the subsequent stage. Therefore, the transmission module is the server 111 or the n-th storage control module (where n is an integer of 1 to (K−1)). The configurations in all the chasses may not be the same. For example, a chassis including the storage control module 113 but not including the server 111 may be mixed or the number of servers 111 may vary depending on the chasses.

Embodiment 3

Hereinafter, Embodiment 3 will be described. Here, differences from Embodiments 1 and 2 will be mainly described and common points to Embodiments 1 and 2 will not be described or will be described in brief.

Figure 13:
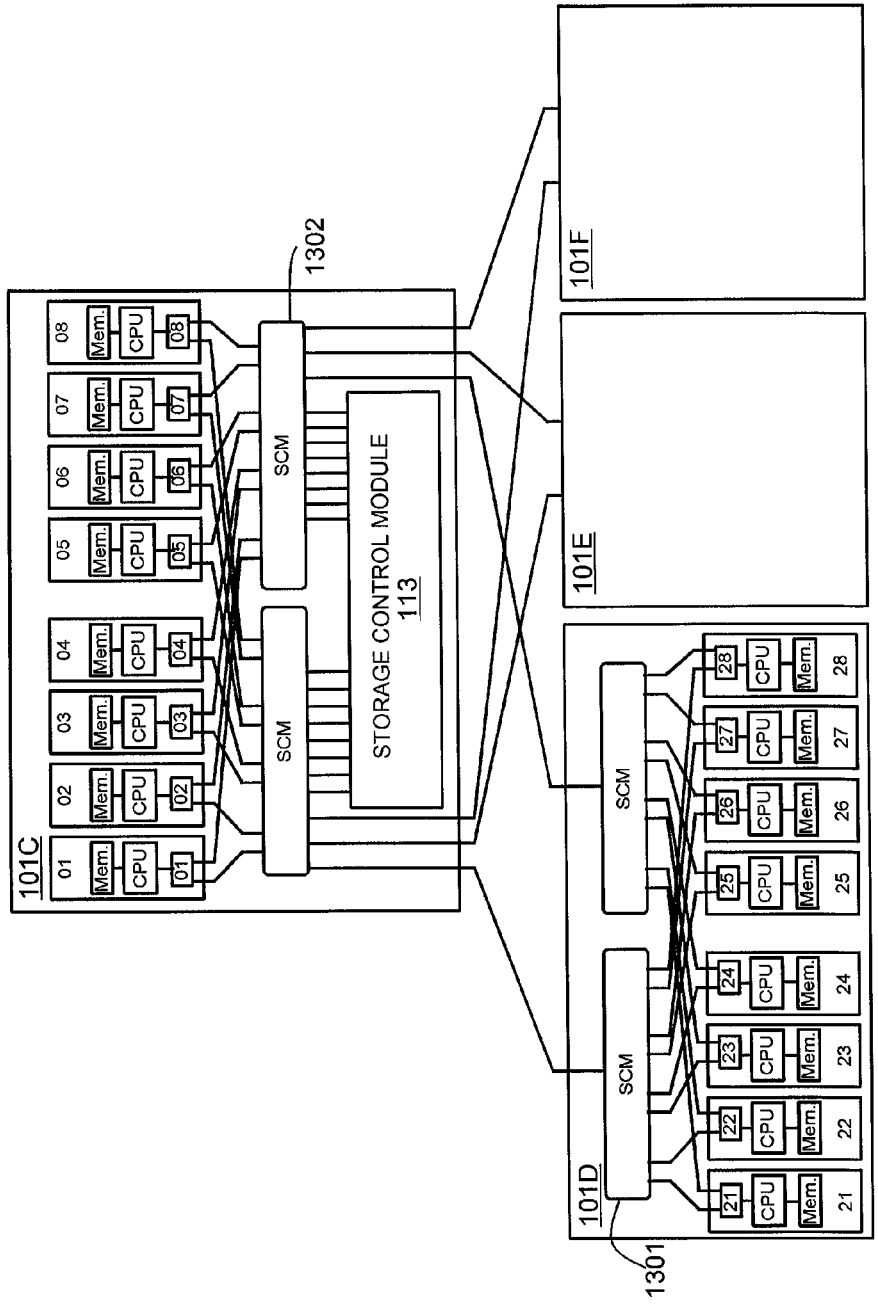
FIG. 13 is a diagram illustrating a configuration of a computer system according to Embodiment 3.

In Embodiment 3, the servers 111 are scaled out (the storages may also be scaled out as described in Embodiment 2). Specifically, Q servers 111 (where Q is an integer of 1 or greater) in addition to N servers 111 (N=8 in Embodiments 1 and 2) are connected to a storage control modules. The (N+Q) servers 111 are connected to the storage control module via plural port extension modules. Regarding the port extension module, for example, since 16 PCIe×4s are drawn out from the storage, 12 ports are switched to be drawn out for different chasses and the remaining four ports support the original eight servers. 12 ports drawn out for different chasses are connected to three chasses by four ports and the eight servers of each chassis use the four ports. In FIG. 13, two PCIe×4s are combined and a server-storage connect module (SCM) 1302 and an SCM 1301 are connected by a PCIe×8 port. In this way, a switch is used to divide a band to increase the number of ports. The storage control module 113 and the SCM 1302 may be connected by eight ports which are PCIe×8. This switch is an internal bus switch and is lower in cost than an FC switch or the like. A line connected to another chassis may change paths by the use of a hardware circuit such as a multiplexer before passing through the internal bus switch of the SCM and may be connected to the internal bus switch in the SCM of another chassis, or a configuration in which the internal bus switches are formed in a multi-stage structure may be avoided to simplify the mechanism. A configuration in which the number of chassis can be increased by connecting the internal buses of the SCMs to one another may be employed. The port extension modules (internal bus switches) can communicate with each other by the PCIe. That is, the port extension modules can communicate with each other using the same communication protocol as the communication protocol between the CPU and the SVIF. In the following example, a port extension module is mounted on an SCM performing a signal adjusting process.

FIG. 13 is a diagram illustrating configuration of a computer system according to Embodiment 3.

In FIG. 13, Q=N=24 is set. That is, other 24 servers 21 to 48 in addition to 8 servers 01 to 08 are connected to the storage control module. The servers 21 to 28 are mounted on a chassis 101D other than the chassis 101C on which the servers 01 to 08 are mounted. The servers 31 to 38 are mounted on a chassis 101E, and the servers 41 to 48 are mounted on a chassis 101F. In FIG. 13, the configurations in the chasses 101E and 101F have the same as the configuration in the chassis 101D and thus are not illustrated. The servers 21 to 28 are mounted on the chassis 101D but the storage control module is not mounted thereon. That is, the chassis 101D may be a chassis for server extension. The same is true of the chassis 101E and the chassis 101F. The chassis 101D includes the servers 21 to 28 and plural SCMs 1301 connected thereto. The SCMs 1301 have plural port extension modules mounted thereon as described above. The chasses 101D, 101E, and 101F may be chasses having the storage control module 113 mounted thereon, similarly to the chassis 101C. In this case, the internal configuration thereof is the same as the internal configuration the chassis 101C. FIG. 13 illustrates a case where the number of chasses is four of 101C, 101D, 101E, and 101F, but the number of chasses may be arbitrary number. In FIG. 13, plural PDEVs 132 connected to the storage control module 113 are not illustrated. The number of connection ports between the storage and the SCM, the number of connection ports between the SCM and the SCM, and the number of connection ports between the server and the SCM may be an arbitrary number. Ports are drawn out from the SCM and may be connected to the storage and the like, for example, using FCs.

The chassis 101C includes plural SCMs 1302 interposed between the servers 01 to 08 and the storage control module 113. The SCM 1302 is an SCM having port extension modules therein. Plural SCMs 1301 in another chassis 101D are connected to the plural SCMs 1302. For example, when the above-mentioned simple switch is used as the port extension module, the storage control module is connected between the connection ports of the SCM 1301 and the SCM 1302 so that the switches of the SCM 1301 and the SCM 1302 do not form two stages. Accordingly, it is possible to avoid the complication of a malfunction processing system due to an increase in the number of stages of the switches. The communication protocol between the plural SCMs 1301 and the plural SCMs 1302 is the PCIe.

Each SCM 1302 includes plural front ports and plural back ports. The front ports are connected to several servers 111 and the back ports are connected to the storage ports of the storage control module 113. In each SCM 1302, when a switch circuit is used as the port extension module, it is controlled whether the connection between the front ports and the back ports should be switched, that is, which server 111 should be connected to the first storage control module out of K storage control modules (where K is an integer of 1 or greater). This switch circuit is, for example, a combination of an internal bus switch and a multiplexer.

In FIG. 13, the SCM is interposed into the I/O flows of writing and reading of each server, but the I/O flows basically comply with FIGS. 6 and 7. By connecting plural servers to a single common storage as in this embodiment, the cost balance of the server and the storage can be optimized in applications having a high server load and having a relatively-light I/O load on the storage. When the server side of the storage control module is defined as a front end, the SCM may be connected to the back end on the SAS side to scale the server and the storage. In addition, plural SCM may be directly connected storage.

While exemplary embodiments have been described above, the present invention is not limited to the embodiments, but can be modified in various forms without departing from the gist thereof.

For example, at least one of the SVIF 123 and the STIF 144 may be constructed by the same circuit as a field programmable gate array (FPGA) instead of the ASIC.

The I/O command of the I/O command and the I/O target data may be transmitted in a method other than the DMA.

Plural BEIF units 204 of the SVIF 123 may be connected to plural MPs constituting an MP cluster. When a target MP of the acquired I/O command is specified as another MP in the MP cluster, the MP 141 may transmit the I/O command to the target MP.

The acquisition of a command or a request from the memory 121 or 143 by the SVIF 123 and the STIF 144 may be performed by polling or may be performed in response to an instruction from the CPU 122 or the MP 141.

In connection between the storage control modules in Embodiment 2, the number of BEIF units of the STIV may increase and may be connected to two or more storage control modules.

What is claimed is:

1. A computer system comprising:
   a first storage control module that includes a plurality of storage processors and storage memory; and
   at least one server module that each includes a server memory, a server processor and a server interface device (server I/F) connected to the server processor and at least two of the plurality of storage processors,
   wherein the server processor of an issuance server which is any one of the at least one server module is configured to issue an I/O request, and
   wherein the server I/F of the issuance server is configured to
   receive the I/O request from the server processor of the issuance server,
   acquire a storage destination address in the server memory of data indicated by the I/O request issued from the issuance server,
   specify the storage processor by referring to sorting information in which identification information of the issuance server issuing the received I/O request, identification information of a destination storage area of the I/O request, and identification information of the storage processor in charge of the destination storage area are correlated with each other,
   send a command based on the I/O request to the specified storage processor, and
   acquire the storage destination address in the storage memory of data indicated by the I/O request, in response to the command sent to the specified storage processor, from the specified storage processor, and
   transmit the data between the acquired storage destination address in the server memory and the acquired storage destination address in the storage memory.

2. The computer system according to claim 1,
   wherein the sorting information is generated by at least one of the plurality of storage processors, and
   wherein the generated sorting information is referred to by the server I/F of the issuance server.

3. The computer system according to claim 1,
   wherein the server I/F and the storage processor are coupled to each other via a bus which couples the server processor and the server I/F.

4. The computer system according to claim 1,
   wherein a connection between the server I/F and the storage processor is carried out by a PCI express protocol.

5. The computer system according to claim 1,
   wherein the identification information of the destination storage area of the I/O request is identification information of a volume provided by a storage area of at least one storage device coupled to the storage control module,
   wherein the sorting information correlates the storage processor in charge of the volume with the volume, and
   wherein the plurality of the volumes are allocated to different storage processors.

6. The storage system according to claim 5,
   wherein the sorting information is updated in at least one of a case where any of the storage processors is in failure and a case where a configuration of any of the volumes is changed.

7. The computer system according to claim 1,
   wherein the first storage control module further includes a transmission I/F,
   wherein the storage processor of the first storage control module is connected to any of a plurality of storage processors included in a second storage control module via the transmission I/F, and wherein the server I/F specifies one of the plurality of storage processors of the second storage control module as a storage processor for processing the I/O request.

8. The computer system according to claim 7,
wherein the transmission I/F receives the command issued on the basis of the I/O request by the server I/F,
wherein at least one of the server I/F of the issuance server and the transmission I/F writes the command to a non-transmission area of the storage memory in the first storage control module when the storage processor specified by the command based on the I/O request is included in the first storage control module, and
wherein at least one of the server I/F of the issuance server and the transmission I/F writes the command to a transmission area of the storage memory in the first storage control module when the storage processor specified by the command based on the I/O request is not included in the first storage control module.

9. The computer system according to claim 1, further comprising a port extension module between the at least one server module and the first storage control module,
wherein another of the at least one server module is coupled to the first storage control module via the port extension module, and
wherein the port extension module controls which of a plurality of server modules coupled to the port extension module is coupled to the first storage control module.

10. A data control method which is performed by a computer system comprising a first storage control module that comprises a plurality of storage processors, storage memory and at least one server module that each includes a server memory, server processor and a server interface device (server I/F) coupled to the server processor and at least two of the plurality of storage processors, the data control method comprising:
issuing an I/O request by the server processor of an issuance server which is any one of the at least one server module;
the data control method further comprising steps by the server I/F of the issuance server,
receiving, the I/O request from the server processor of the issuance server;
acquiring a storage destination address in the server memory of data indicated by the I/O request issued from the issuance server,
specifying, the storage processor, by referring to sorting information in which identification information of the issuance server issuing the received I/O request, identification information of a destination storage area of the I/O request, and identification information of the storage processor in charge of the destination storage area are correlated with each other;
sending a command based on the I/O request to the specified storage processor, and
acquiring the storage destination address in the storage memory of data indicated by the I/O request, in response to the command sent to the specified storage processor, from the specified storage processor, and
transmitting the data between the acquired storage destination address in the server memory and the acquired storage destination address in the storage memory.

11. The data control method according to claim 10, further including
generating the sorting information by at least one of the plurality of storage processors,
wherein the generated sorting information is referred to by the server I/F of the issuance server.

12. The data control method according to claim 10, further including
the server I/F and the storage processor being coupled to each other via a bus which connects the server processor and the server I/F.

13. The data control method according to claim 10, further including connecting the server I/F and the storage processors by PCI express protocol.

14. The data control method according to claim 10, further including
the identification information of the destination storage area of the I/O request being identification information of a volume provided by a storage area of at least one storage device coupled to the storage control module,
wherein the sorting information correlates the storage processor in charge of the volume with the volume, and
allocating the plurality of the volumes to different storage processors.

15. The data control method according to claim 14, further including
updating the sorting information in at least one of a case where any of the storage processors is in failure and a case where a configuration of any of the volumes is changed.

16. The data control method according to claim 10, further including
the first storage control module having a transmission I/F,
the storage processor of the first storage control module being connected to any of a plurality of storage processors included in a second storage control module via the transmission I/F, and
the server I/F specifying one of the plurality of storage processors of the second storage control module as a storage processor for processing the I/O request.

17. The data control method according to claim 16, further including
the transmission I/F receiving the command issued on the basis of the I/O request by the server I/F,
at least one of the server I/F of the issuance server and the transmission I/F writing the command to a non-transmission area of the storage memory in the first storage control module when the storage processor specified by the command based on the I/O request is included in the first storage control module, and
at least one of the server I/F of the issuance server and the transmission I/F writing the command to a transmission area of the storage memory in the first storage control module when the storage processor specified by the command based on the I/O request is not included in the first storage control module.

18. The data control method according to claim 10, further including
a port extension module between the at least one server module and the first storage control module,
another of the at least one server module being coupled to the first storage control module via the port extension module, and
the port extension module controlling which of a plurality of server modules coupled to the port extension module is coupled to the first storage control module.

* * * * *